(12) United States Patent
Nalen et al.

(10) Patent No.: US 12,300,080 B2
(45) Date of Patent: May 13, 2025

(54) MOTION DETECTION

(71) Applicant: SimpliSafe, Inc., Boston, MA (US)

(72) Inventors: Steven Nalen, Winthrop, MA (US); Michael Maichen, II, Boston, MA (US); Derek Thomas Witt, Somerville, MA (US); James Eric Arenstam, Attleboro, MA (US)

(73) Assignee: SimpliSafe,Inc., Boston, MA (US)

( * ) Notice: Subject to any disclaimer, the term of this patent is extended or adjusted under 35 U.S.C. 154(b) by 197 days.

(21) Appl. No.: 18/096,883

(22) Filed: Jan. 13, 2023

(65) Prior Publication Data

US 2023/0232090 A1 Jul. 20, 2023

Related U.S. Application Data

(60) Provisional application No. 63/300,232, filed on Jan. 17, 2022, provisional application No. 63/300,231, (Continued)

(51) Int. Cl.
*G08B 13/191* (2006.01)
*G01J 5/00* (2022.01)
(Continued)

(52) U.S. Cl.
CPC .......... *G08B 13/191* (2013.01); *G01J 5/0022* (2013.01); *G02B 3/08* (2013.01); *G08B 29/185* (2013.01); *G08B 13/1895* (2013.01); *H04N 23/23* (2023.01); *H04N 23/51* (2023.01); *H04N 23/54* (2023.01)

(58) Field of Classification Search
CPC ..... G01J 5/0022; G02B 3/08; G08B 13/1895; G08B 13/191; G08B 29/185; H04N 23/23; H04N 23/51; H04N 23/54
See application file for complete search history.

(56) References Cited

U.S. PATENT DOCUMENTS

| | | | |
|---|---|---|---|
| 3,331,065 | A | 7/1967 | McDonald |
| 4,307,388 | A | 12/1981 | Doenges |

(Continued)

FOREIGN PATENT DOCUMENTS

| | | |
|---|---|---|
| CN | 208505473 U | 2/2019 |
| CN | 110415486 B | 7/2021 |

(Continued)

OTHER PUBLICATIONS

International Search Report and Written Opinion issued Jul. 14, 2023 for International Patent Application No. PCT/US2023/010789.

(Continued)

*Primary Examiner* — Mark R Gaworecki
(74) *Attorney, Agent, or Firm* — Pierce Atwood LLP

(57) ABSTRACT

Motion detectors can include a housing defining a first cavity and an aperture extending through the housing. A circuit board can be disposed in the first cavity. An infrared sensor and a light sensor can be mounted on the circuit board. A lens can extend across the aperture. A wall can extend between the lens and the circuit board such that the wall, the lens, and the circuit board define a second cavity at least partially within the first cavity and the second cavity contains the infrared sensor and the light sensor.

32 Claims, 16 Drawing Sheets

Related U.S. Application Data filed on Jan. 17, 2022, provisional application No. 63/300,229, filed on Jan. 17, 2022, provisional application No. 63/300,234, filed on Jan. 17, 2022, provisional application No. 63/300,230, filed on Jan. 17, 2022, provisional application No. 63/300,233, filed on Jan. 17, 2022.

(51) Int. Cl.
*G02B 3/08* (2006.01)
*G08B 29/18* (2006.01)
*G08B 13/189* (2006.01)
*H04N 23/23* (2023.01)
*H04N 23/51* (2023.01)
*H04N 23/54* (2023.01)

(56) References Cited

U.S. PATENT DOCUMENTS

| | | |
|---|---|---|
| 4,523,095 A | 6/1985 | Keller-Steinbach |
| 4,873,442 A | 10/1989 | Klatt |
| 5,309,147 A | 5/1994 | Lee |
| 5,434,560 A | 7/1995 | King |
| 5,684,458 A | 11/1997 | Calvarese |
| 5,920,259 A | 7/1999 | Shpater |
| 6,111,256 A | 8/2000 | Shpater |
| 6,265,972 B1 | 7/2001 | Lee |
| 8,587,415 B1 | 11/2013 | Followell |
| 10,502,654 B1 | 12/2019 | Schroeder |
| 2005/0040947 A1 | 2/2005 | Buckley et al. |
| 2005/0184869 A1 | 8/2005 | Micko |
| 2007/0156190 A1 | 7/2007 | Cinbis |
| 2007/0239215 A1 | 10/2007 | Bhunia |
| 2008/0218340 A1 | 9/2008 | Royer |
| 2011/0057105 A1 | 3/2011 | Buckley |
| 2011/0212698 A1 | 9/2011 | Le Guillou |
| 2012/0218086 A1 | 8/2012 | Miller |
| 2012/0245867 A1 | 9/2012 | Czyzewski |
| 2012/0314729 A1 | 12/2012 | Ogawa |
| 2015/0374267 A1 | 12/2015 | Laughlin |
| 2016/0000359 A1 | 1/2016 | Li |
| 2016/0138824 A1 | 5/2016 | Patel |
| 2017/0147879 A1 | 5/2017 | Alameh |
| 2017/0206397 A1 | 7/2017 | Picard |
| 2018/0177032 A1 | 6/2018 | Recker |
| 2020/0021371 A1 | 1/2020 | Laugeois |
| 2020/0342748 A1 | 10/2020 | Tournier |
| 2021/0080482 A1 | 3/2021 | Cieloch |
| 2022/0104704 A1 | 4/2022 | Zakharov |
| 2022/0287629 A1 | 9/2022 | Forsyth |
| 2022/0364332 A1 | 11/2022 | Ishikawa |

FOREIGN PATENT DOCUMENTS

| | | |
|---|---|---|
| EP | 2058673 A2 | 5/2009 |
| EP | 2533026 A2 | 12/2012 |
| TW | M571092 U | 12/2018 |
| WO | WO-2017147462 A1 * | 8/2017 ............ G01J 5/0025 |

OTHER PUBLICATIONS

Office Action issued Jun. 20, 2024 for U.S. Appl. No. 18/097,068.
Invitation to Pay Additional Fees issued May 2, 2023 for International Patent Application PCT/US2023/010789.
Office Action mailed Apr. 7, 2025 for Taiwanese Patent Application No. 11210761.

* cited by examiner

MOTION DETECTION

CROSS-REFERENCE TO RELATED APPLICATION

This application claims priority under 35 USC § 119(e) to U.S. Patent Application Ser. Nos. 63/300,234, 63/300,233, 63/300,232, 63/300,231, 63/300,230, and 63/300,229, filed on Jan. 17, 2022, the entire contents of which are hereby incorporated by reference.

BACKGROUND

Motion detection is used in the security industry to alert a user when motion is detected in a home, business, or private space.

SUMMARY

In an aspect, a method includes receiving, by a motion detector of a plurality of motion detectors, a message configured to cause the motion detector to remain in an armed state upon receipt of a command to change the state of the motion detector to a disarmed state, receiving, by the motion detector, the command to change from the armed state to the disarmed state, determining, by the motion detector, that the motion detector is to remain in the armed state based on a first value stored within memory of the motion detector, and disregarding, by the motion detector, the command to change from the armed state to a disarmed state, so that the motion detector remains in the armed state while other motion detectors of the plurality are in the disarmed state.

In some embodiments, the method includes receiving, by the motion detector, a message configured to change the first value stored within the memory of the motion detector and cause the motion detector to change from the armed state to the disarmed state.

In some embodiments, a second value within the memory of the motion detector represents whether the current state of the motion detector is the armed state or the disarmed state.

In some embodiments, causing the motion detector to change from the armed state to the disarmed state includes changing the second value and deactivating sensors of the motion detector.

In some embodiments, the method includes receiving, by the motion detector, a command to change the state of the motion detector to an armed state.

In some embodiments, changing the state of the motion detector to an armed state includes changing the second value and activating the sensors of the motion detector.

In some embodiments, the message configured to cause the motion detector to remain in an armed state upon receipt of a command to change the state of the motion detector to the disarmed state further causes the motion detector to change the first value stored within the memory of the motion detector.

In an aspect, a motion detector includes an infrared sensor to generate a signal, a memory configured to store one or more values, and a processor operable to receive a message configured to cause the motion detector to remain in an armed state upon receipt of a command to change the state of the motion detector to a disarmed state, receive the command to change from the armed state to the disarmed state, determine that the motion detector is to remain in the armed state based on a first value stored within the memory of the motion detector, and disregard the command to change from the armed state to the disarmed state, so that the motion detector remains in the armed state.

In some embodiments, the processor is operable to receive, by the motion detector, a message configured to change the first value stored within the memory of the motion detector and cause the motion detector to change from the armed state to the disarmed state.

In some embodiments, a second value within the memory of the motion detector represents whether the current state of the motion detector is the armed state or the disarmed state.

In some embodiments, causing the motion detector to change from the armed state to the disarmed state includes changing the second value and deactivating sensors of the motion detector.

In some embodiments, the processor is operable to receive, by the motion detector, a command to change the state of the motion detector to an armed state.

In some embodiments, changing the state of the motion detector to an armed state includes changing the second value and activating the sensors of the motion detector.

In some embodiments, the message configured to cause the motion detector to remain in an armed state upon receipt of a command to change the state of the motion detector to the disarmed state further causes the motion detector to change the first value stored within the memory of the motion detector.

In an aspect, a method includes sampling, by a motion detector, a signal from a infrared detector over a time interval, determining an average power of the sample from the infrared detector over the time interval exceeds a threshold, and in response to the average power of the sample exceeding the power threshold, sending an alert that motion has been detected.

In some embodiments, the average power of the sample over the time interval is determined using a root-mean-square (RMS) calculation.

In some embodiments, duration of the time interval is remotely adjustable.

In some embodiments, duration of the time interval is approximately 6.5 seconds.

In some embodiments, the method includes sampling data from a light sensor over the time interval, determining an average power of the sample from the light sensor over the time interval, and adjusting the threshold based on the average power of the sample from the light sensor over the time interval.

In some embodiments, the infrared sensor is one of a first pair of infrared sensors receiving infrared radiation.

In some embodiments, the method includes receiving infrared radiation from a second portion of the individual zones at a second pair of infrared sensors, detecting motion of an object within a first portion of one of a plurality of zones based on changes of infrared radiation measured with a first pair of infrared sensors, detecting motion of the object within a second portion of one of the zones based on changes of infrared radiation measured with the second pair of infrared sensors, and in response to the detection of motion of the object within the first and second portions of the zones, indicating that motion has been detected.

In some embodiments, measuring infrared radiation with the first pair of infrared sensors receiving infrared radiation from the first portion of the individual zones and the second pair of infrared sensors receiving infrared radiation from the second portion of the individual zones includes measuring infrared radiation received through a Fresnel lens from a plurality of zones in a space with the first pair of infrared sensors receiving infrared radiation from the first portion of individual zones and the second pair of infrared sensors receiving infrared radiation from the second portion of the individual zones.

In an aspect, a motion detector includes an infrared sensor to generate a signal, and a processor operable to sample the signal from an infrared detector, determine that the average power of the sample over a time interval exceeds a threshold and, in response to the average power of the sample exceeding the threshold, indicate motion.

In some embodiments, the motion detector includes a light sensor.

In some embodiments, the processor is operable to sample data from the light sensor, and in response to the sample from the light sensor, adjust the threshold.

In some embodiments, the motion detector includes a transceiver, wherein the processor is further operable to indicate motion by sending a signal via the transceiver.

In some embodiments, the motion detector includes a temperature sensor, wherein the processor is further operable to sample data from the temperature sensor and in response to the sample from the temperature sensor, adjust the threshold.

DETAILED DESCRIPTION

This specification describes methods and systems for detecting motion. These methods and systems efficiently detect motion, and alert a user of the motion, and reduce the number of false positives in motion detection. For example, the methods and systems can account for or otherwise address a number of variables that trigger false positives.

Although some motion is motion of concern (i.e., motion indicative of problem such as a person moving through a house with alarms set), some motion is not of concern (i.e., motion not indicative of a problem, for example, a fan oscillating, a pet walking through the house, or a robot vacuum cleaner in operation). False positives may be related to movement that is not of concern (e.g., a pet crossing the field of view of a sensor) or to non-movement events (e.g., a flashing light, exposure to direct and indirect sunlight, air flow generated by heating and cooling systems, or radiators in the motion detector field of view) that trigger an alert. These systems and methods incorporate additional sensors and improved processing methods that can account for or otherwise address such variables and effectively reduce the number of false positives.

Figure 1A:
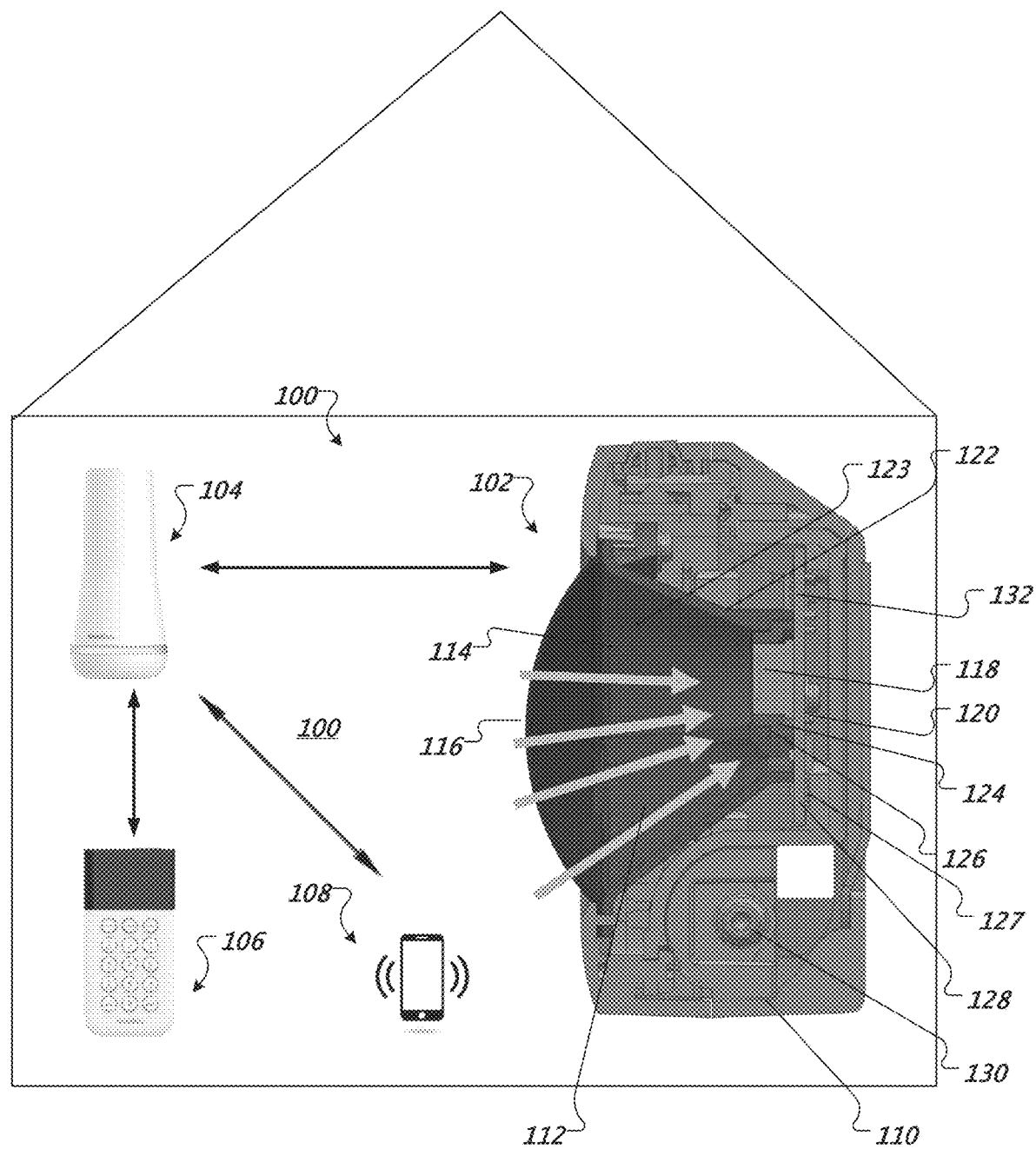
FIG. 1A-1D are illustrations of a motion detection system.

FIG. 1A illustrates a system 100 that includes a motion detector 102, a base station 104, a keypad 106, and a mobile computing device (e.g., a phone 108). The motion detector 102 includes a processor that analyzes and processes signals received from sensors to determine motion has been detected. Alternatively or additionally, some base stations 104 include a processor that analyzes and processes signals received from sensors to determine motion has been detected.

If the system 100 determines that motion is detected, it can alert the user. For example, the base station 104 includes a speaker that indicates an alarm condition in response to detection of motion. In another example, the base station 104 transmits a signal to the phone 108, which alerts the user to an alarm condition. In some implementations, the base station 104 and/or the motion detector 102 initiates a text or call to the phone 108. In some embodiments, the base station 104 can notify the phone 108 through a push notification or on an app.

The keypad 106 allows a user to access or control the system 100 by receiving input and transmitting that input to the base station 104. For example, a user can input a password into the keypad 106 to arm the system 100 or disarm the system 100. Once armed, the system 100 can alert users of an alarm condition based on detected motion. The phone 108 also allows a user to access or control the system 100, for example, through an app.

The motion detector 102 has a housing 110 and a first cavity 112 defined in part by the housing. An aperture 114 extends through the housing to allow light and infrared energy to enter the housing 110. A Fresnel lens 116 extends across and covers the aperture 114 to refract incoming light and infrared signals. The Fresnel elements of the lens 116 allow for a larger field of view than a traditional lens. For example, an individual Fresnel elements of the lens 116 is associated with a respective zone of the field of view, and refracts signals from that respective zone into a passive infrared sensor 118. The passive infrared sensor 118 is a pyroelectric receiver. The sensor 118 is a quad element dual channel receiver, having four individual receiver elements split into two channels (e.g., each channel has two receiver elements). Two of the infrared elements receive infrared radiation from a first portion of the individual zones and two of the infrared elements receive infrared radiation from a second portion of the individual zones. Some motion detectors have more channels. Increasing the number of channels increases the resolution of the detector but increases power usage.

Individual channels have a positive and a negative side, that generates a signal in response to received infrared radiation. The signals are added together with changes in the summed signal indicating a change in which element is receiving more infrared radiation. These changes in infrared radiation from one side of the receiver element to the other side of the receiver element can be indicative of motion.

The sensor 118 is mounted to a circuit board 120 contained within the housing 110 and disposed within the first cavity 112. The motion detector 102 also includes a member or wall 122 which protects the sensor 118. The wall 122 extends between the lens 116 and the circuit board 120 such that the wall 122, the lens 116, and the circuit board 120 define a second cavity 123, which is at least partially within the first cavity 112. The second cavity 123 contains the infrared sensor 118 and a light sensor 126.

The wall 122 acts as a guard or protective shield, preventing bugs entering the space between the lens 116 and the sensor 118. The wall 122 has a rough, textured surface (e.g., is formed of black plastic with a matte texture) that scatters and absorbs unfocused energy. By absorbing radiation that enters through regions of the lens that are not covered by Fresnel elements, the wall reduces the likelihood that, for example, a light blinking in the sensor's field of view will trigger a false positive. This is significant because the passive infrared sensor 118 is sensitive to both infrared radiation and, at a lower level, visible light as well. Some passive infrared sensors are sensitive enough that, without the mitigation provided by the wall 122, a purely visible light source blinking in the sensor's field of view can trigger a false positive.

A silicone sleeve 124 seals the wall 122 and thermally insulates the second cavity 123. Temperature changes can affect the sensor 118, so thermally insulating the sensor 118 can reduce the likelihood that airflow, e.g., from a vent directed at the sensor, may introduce warm or cold air into the second cavity 123 and influence the sensor output. The wall 122 and the sleeve 124 also separate the sensor 118 from other heat generating components of the detector.

An ambient light sensor 126 (e.g., a photodetector more sensitive to visible light and ultraviolet radiation than to infrared radiation) is mounted on the circuit board 120 next to the sensor 118. The light sensor 126 detects light from broad spectrum sources (e.g., sunlight, light emitted from a light bulb turning on, or light projected from a strong flashlight) which also emit infrared radiation. This additional infrared radiation is received by the sensor 118, but is not indicative of motion. The light sensor 126 is helpful in accounting for light that would otherwise cause false positives. The motion detector 102 also includes a temperature sensor 128, which can be used to compensate for temperature effects on measured infrared radiation.

A radio frequency (RF) transceiver 127 is operable to send data from the motion detector 102 to other components of the system 100 (e.g., the base station 104) and to receive signals from other components of the system (e.g., the base station 104). For example, the motion detector 102 can send data received by the different sensors to the base station 104. Some systems have a RF transmitter and a separate RF receiver rather than a transceiver.

A battery 130 powers the electronics of the motion detector 102. The RF receiver and a microcontroller unit can be on a different circuit than the other electronics (e.g., the PIR sensor 118 and the ambient light sensor 126) in the motion detector 102 so that the RF receiver can be powered on with the other electronics powered off. This "sleep" mode of the motion detector 102 consumes a minimal amount of energy, while allowing the motion detector 102 to receive signals (e.g., from the base station 104).

Figure 1B:
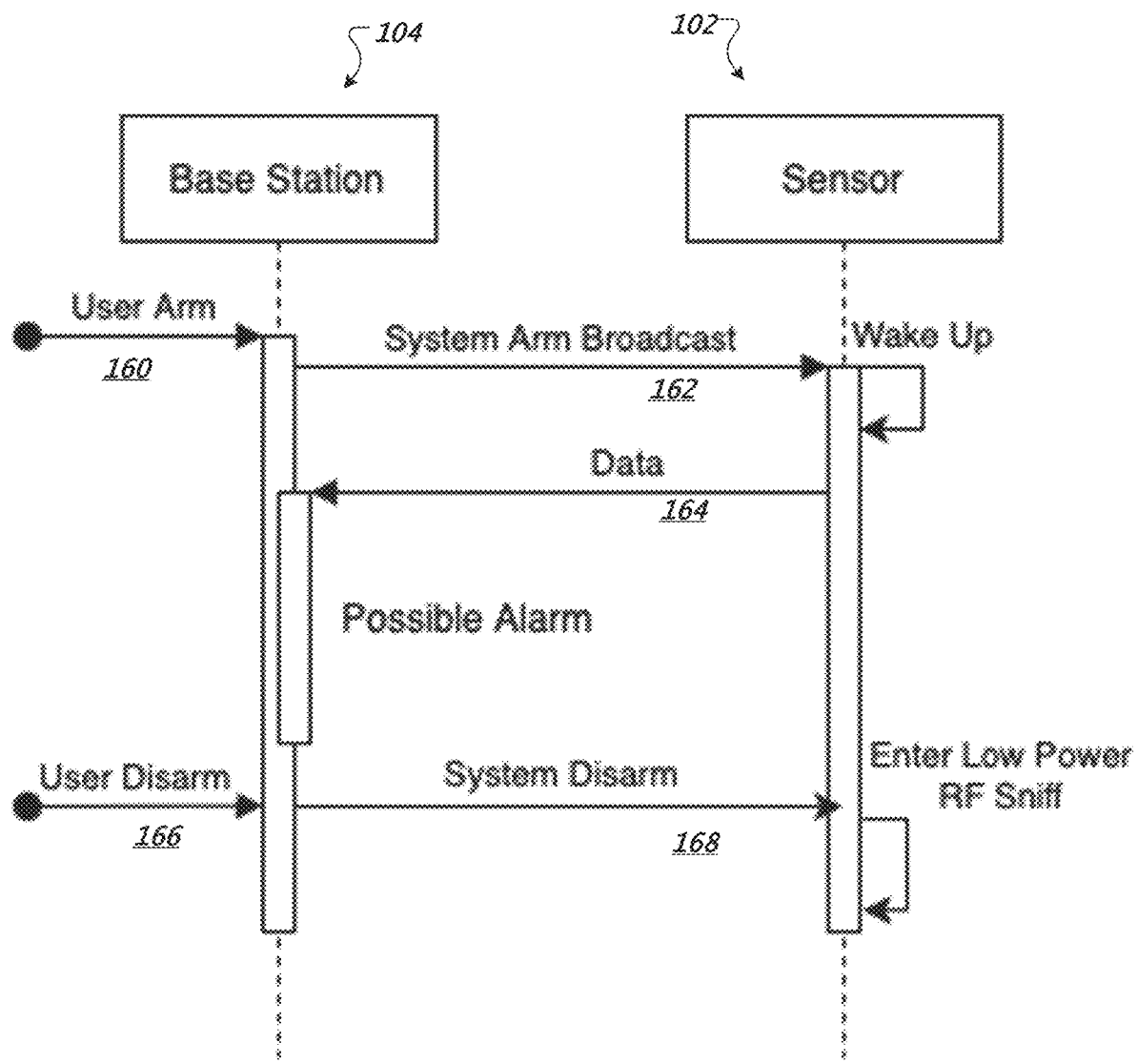

FIG. 1B illustrates exemplary communications between the motion detector 102 and the base station 104. The motion detector 102 is initially in a "sleep" mode, in which some or all electronics other than the RF receiver and the microcontroller unit are powered off. A user can arm the system by using the keypad 106 or the phone 108 to input a command 160 to arm the system 100. The base station 104 receives the command 160 and, in response, sends a broadcast signal 162 to the motion detector 102. The motion detector 102 receives the broadcast signal 162 and, in response, powers on additional electronics (e.g., the infrared sensor, the light sensor, etc.) of the detector 102. After the electronics are powered on, the motion detector 102 begins processing signals generated by the sensors to determine whether motion is detected, as discussed further below. If the motion detector 102 determines that motion is detected, a signal 164 with a detection flag is sent to the base station 104 and an alert will be sent to a user. In some systems, the motion detector 102 sends sensor data (e.g., from the infrared sensor, light sensor, and temperature sensor) to the base station 104 for processing.

When the user wants to disarm the system, the user can use the keypad 106 or the phone 108 to input a command 166 to disarm the system 100. The base station 104 receives the command 166 and, in response, sends a broadcast signal 168 to the motion detector 102. The motion detector 102 receives the broadcast signal 168 and enters "sleep" mode, powering off at least some of electronics other than the RF receiver and the microcontroller unit. The motion detector 102 stops sending data 164 to the base station 104 because the sensors and the RF transmitter of the motion detector 102 are powered off.

In some implementations, after the motion detector 102 determines that motion is detected, the motion detector 102 will enter a "blind" mode in which it does not send signals to the base station for a period of time (e.g., 110 seconds). In some implementations, entering a "blind" mode for a longer period of time saves power because the motion detector 102 sends fewer signals. The motion detector 102 can enter the "blind" mode upon arming, and the length of the "blind" mode can allow a user to exit the view of the motion detector 102 without the motion detector 102 sending signals to the base station. The "blind" mode can stop a detected motion from producing multiple alerts. For example, in some cases a user may not want to receive multiple alerts from detected motion that lasts a short amount of time (e.g., receiving three alerts within thirty seconds). The "blind" mode prevents the motion detector from sending multiple signals for the period of time (e.g., 110 seconds), so when the lengthened "blind" mode is implemented, the user only receives one signal from the motion detector 102 until the period of time lapses.

In some implementations, duration of the "blind" mode can be reduced, e.g., to 10 seconds. The duration of the "blind" mode can be can be changed remotely in some systems. These remote updates can be input into the system 100 by use of the keypad 106 or the phone 108. Reducing the duration of the "blind" mode can allow for increased monitoring of the protected area. For example, if motion is detected on the same motion detector 102 every 10 seconds, then a user would know that the cause of the alert is staying within view of the motion detector 102. In some implementations, duration of the "blind" mode can be reduced further, e.g., to six seconds. A duration of six seconds provides a large enough time window to account for random motion events while allowing for increased monitoring of the protected area. A duration of 10 seconds can be advantageous, e.g., to provide a brief "blind" mode in which other motion detectors can send alerts.

Figure 1C:
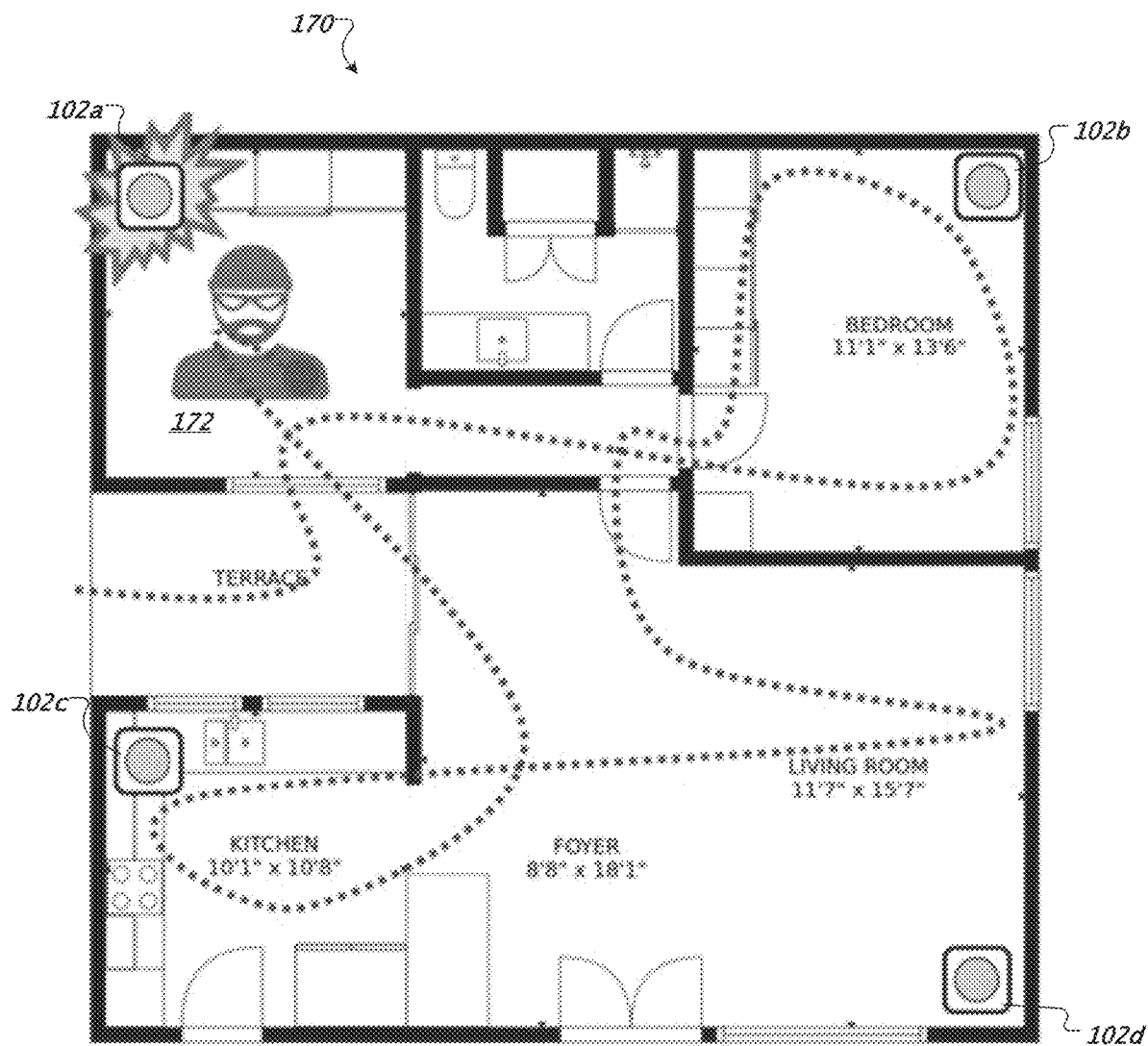

FIG. 1C illustrates an exemplary scenario in which multiple motion detectors 102a, 102b, 102c, 102d are installed in different rooms of a house 170 and an intruder enters the house while the system is armed. In response to the first motion detector 102a detecting motion of an intruder 172, the motion detector 102a sends a signal to the base station indicating motion and an alert is sent to the user. As the intruder leaves the first room and enters the bedroom, the second motion detector 102b sends a signal to the base station indicating motion. As the intruder passes through the living room, foyer, and kitchen before returning to the first room, this sequence is repeated for the motion detectors 102c, 102d, 102a installed in the living room, the kitchen, and the first room, respectively.

If the motion detectors 102a, 102b, 102c, 102d have a "blind" mode with a duration in range of minutes rather than seconds, the detailed knowledge of motion of the intruder throughout the house after he initially triggers the alerts is limited. For example, when the intruder returns to the first room and triggers an alert on motion detector 102a, any further motion in the field of view of motion detector 102a will not trigger signals from the motion detector 102a for the duration of the "blind" mode. The intruder 172 can remain within the field of view of the motion detector 102a without the motion detector 102a sending signals or he can leave and reenter the field of view of motion detector 102a without the motion detector 102a sending signals.

If the motion detectors 102a, 102b, 102c, 102d have a significantly reduced "blind" mode duration (e.g., reduced to 10 seconds or less), then they can increase monitoring of the protected area. For example, when the intruder triggers an alert on motion detector 102a, further motion in view of the motion detector 102a triggers signals to be sent from the motion detector 102a due to the reduced duration of the "blind" mode. If the intruder remains in the field of view of the motion detector 102a and continues moving, the motion detector 102a continues to alert the user that the intruder is there. This increased motion detection can provide a number of benefits. The motion detectors can provide real-time information about the current location of the intruder, e.g., to first responders. The reduced duration of the "blind" mode can also provide additional information about the detected motion to the user. For example, the signals can provide information on whether the detected motion is starting and stopping, rather than only whether motion is detected.

In some implementations, the motion detectors 102a, 102b, 102c, 102d can be set to different settings. For example, a user can control which motion detectors have a reduced duration of the "blind" mode remotely in some systems. These remote updates can be input into the system 100 by use of the keypad 106 or the phone 108. For example, some of the motion detectors 102a, 102b, 102c, 102d can have a reduced duration of the "blind" mode while some of the other motion detectors do not have a reduced duration of the "blind" mode. This can allow a user to increase monitoring in some areas (e.g., by reducing the duration of the "blind" mode in those areas) while saving power in other areas (e.g., by increasing the duration of the "blind" mode in those areas).

Some systems include one or more motion detectors that have an optional "secret" mode. When a motion detector 102 with this functionality is placed in "secret" mode, the motion detector 102 remains armed even when the system is disarmed. The "secret" mode can be useful, e.g., when a user wants to monitor a location even when the system (e.g., other motion detectors in the system) is disarmed. For example, the user may want to monitor a safe at all times, including when he or she is at home and his or her alarm system is disarmed. For example, the motion detector can change a value (e.g., a binary value) that represents whether "secret" mode is activated. When the value represents that "secret" mode is activated, the motion detector 102 will remain armed regardless of whether the system is armed.

Figure 1D:
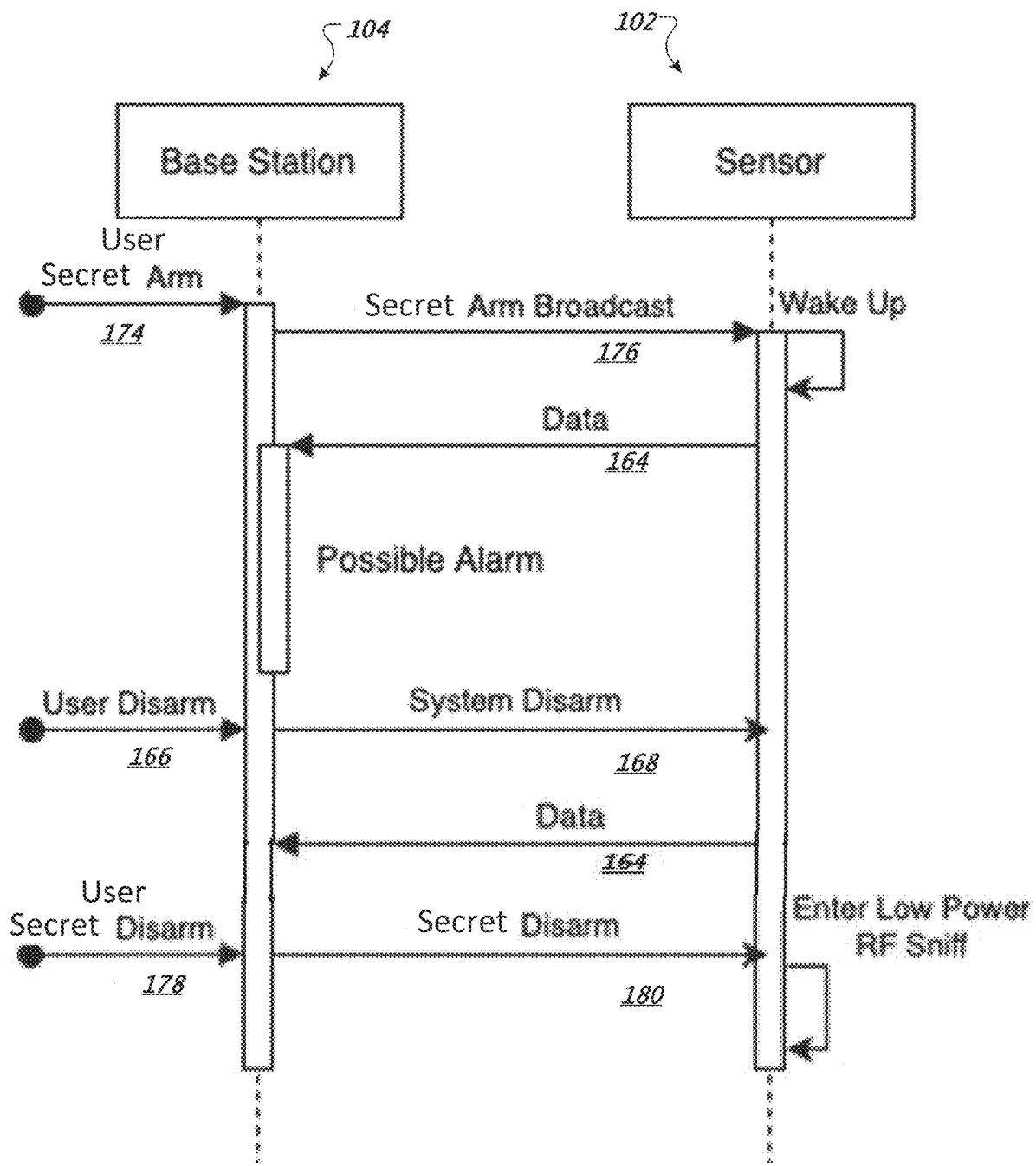

FIG. 1D illustrates exemplary communications between the motion detector 102 and the base station 104 in a system in which one or more motion detectors have the optional "secret" mode. In the illustrated communications, the motion detector 102 is initially in a "sleep" mode, in which some or all electronics other than the RF receiver and the microcontroller unit are powered off. A user activates the motion detector 102 in "secret" mode by using the keypad 106 or the phone 108 to input a "secret" arm command 174 to the system 100. The input "secret" arm command 174 is different than the command 160 described in FIG. 1B, e.g., because the user intends to activate the motion detector 102 to remain armed regardless of whether the system is armed. The base station 104 receives the "secret" arm command 174 and, in response, sends a "secret" arm broadcast signal 176 to a selected motion detector 102. The motion detector 102 receives the "secret" arm broadcast signal 176 and, in response, powers on additional electronics (e.g., the infrared sensor, the light sensor, etc.) of the detector 102. The motion detector also activates a "secret" mode setting. For example, the motion detector can change the value that represents whether "secret" mode is activated so that the motion detector 102 will remain armed regardless of whether the system is armed. After the electronics are powered on, the motion detector 102 begins processing signals generated by the sensors to determine whether motion is detected. If the motion detector 102 determines that motion is detected, a signal 164 with a detection flag is sent to the base station 104 and an alert is sent to a user. In some systems, the motion detector 102 sends sensor data (e.g., from the infrared sensor, light sensor, and temperature sensor) to the base station 104 for processing.

When the user disarms the system, the user uses the keypad 106 or the phone 108 to input a command 166 to disarm the system 100. The base station 104 receives the command 166 and, in response, sends a broadcast signal 168 to the motion detector 102. However, since the motion detector 102 is in "secret" mode (e.g., the "secret" mode setting is activated), the motion detector 102 does not enter "sleep" mode. Instead, the motion detector 102 remains in "secret" arm mode and processes signals generated by the sensors to determine whether motion is detected. When the user disarms the motion detector 102 from "secret" mode, the user uses the keypad 106 or the phone 108 to input a command 178 to deactivate the "secret" mode setting. For example, the user can press a button that deactivates the "secret" mode setting. The base station 104 receives the command 166 and, in response, sends a broadcast signal 180 to the motion detector 102. The motion detector 102 receives the broadcast signal 180 and deactivates the "secret" mode. For example, the motion detector can change the value that represents whether "secret" mode is activated, e.g., by storing a different value within the memory of the motion detector. If the system is disarmed when the motion detector deactivates the "secret" mode, then the motion detector enters "sleep" mode, powering off at least some of electronics other than the RF receiver and the microcontroller unit. The motion detector 102 stops sending data 164 to the base station 104 because the sensors and the RF transmitter of the motion detector 102 are powered off. If the system 100 is armed when the motion detector deactivates the "secret" mode, then the motion detector continues processing signals generated by the sensors to determine whether motion is detected. The motion detector remains armed until the user disarms the system, using the keypad 106 or the phone 108 to input a command 166 to disarm the system 100.

The motion detector 102 can store values relating to whether it is armed, disarmed, in secret mode, in continuous mode, etc. In some implementations, binary values can be stored for each mode of the motion detector 102.

Figure 2:
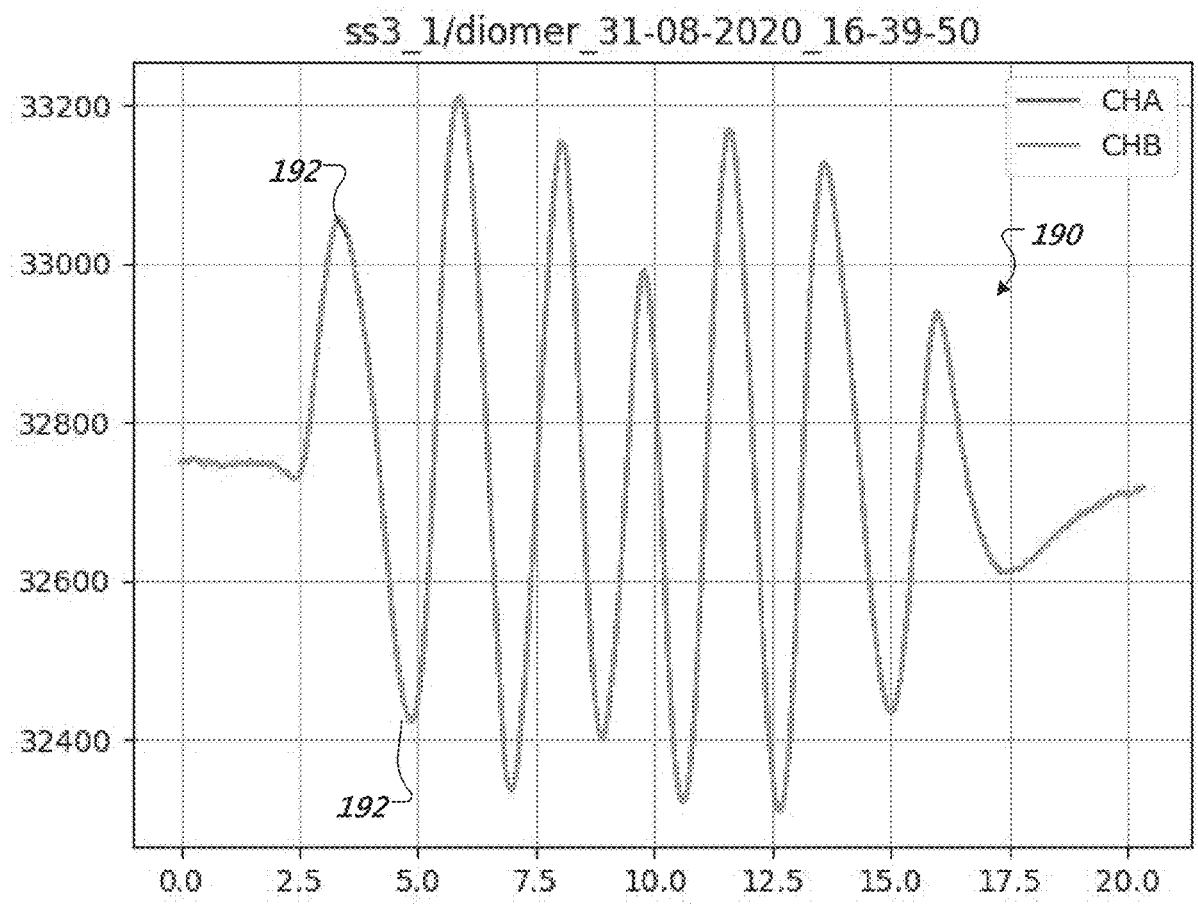
FIG. 2 is an illustration of signals received by a motion detection sensor.

FIG. 2 illustrates an exemplary signal 190 from one of the infrared sensors of the motion detector 102. The signal 190 is in the form of a sine wave. Individual cycles of the sine wave corresponds to a zone of the field of view. For example, two cycles of the sine wave are indicative of motion across two zones of the field of view. Each peak 192 (e.g., local minima or maxima) in the sine wave is indicative of motion across zones. The signal 190 can be processed to count the number of peaks 192, as discussed further below. Because individual peaks 192 are indicative of motion, a greater number of peaks 192 is indicative of a greater amount of motion detected.

Signals received from the light sensor are similar to those of the infrared receiver. The number of peaks in a signal from the light sensor is indicative of a light event, and a greater the number of peaks is indicative of a larger light event. The size of the light event can be useful in determining whether the light event is likely to interfere with the infrared receiver (e.g., due to additional infrared radiation from the light event). If a light event is likely to interfere with the infrared receiver, the light event is considered harmful.

Figure 3:
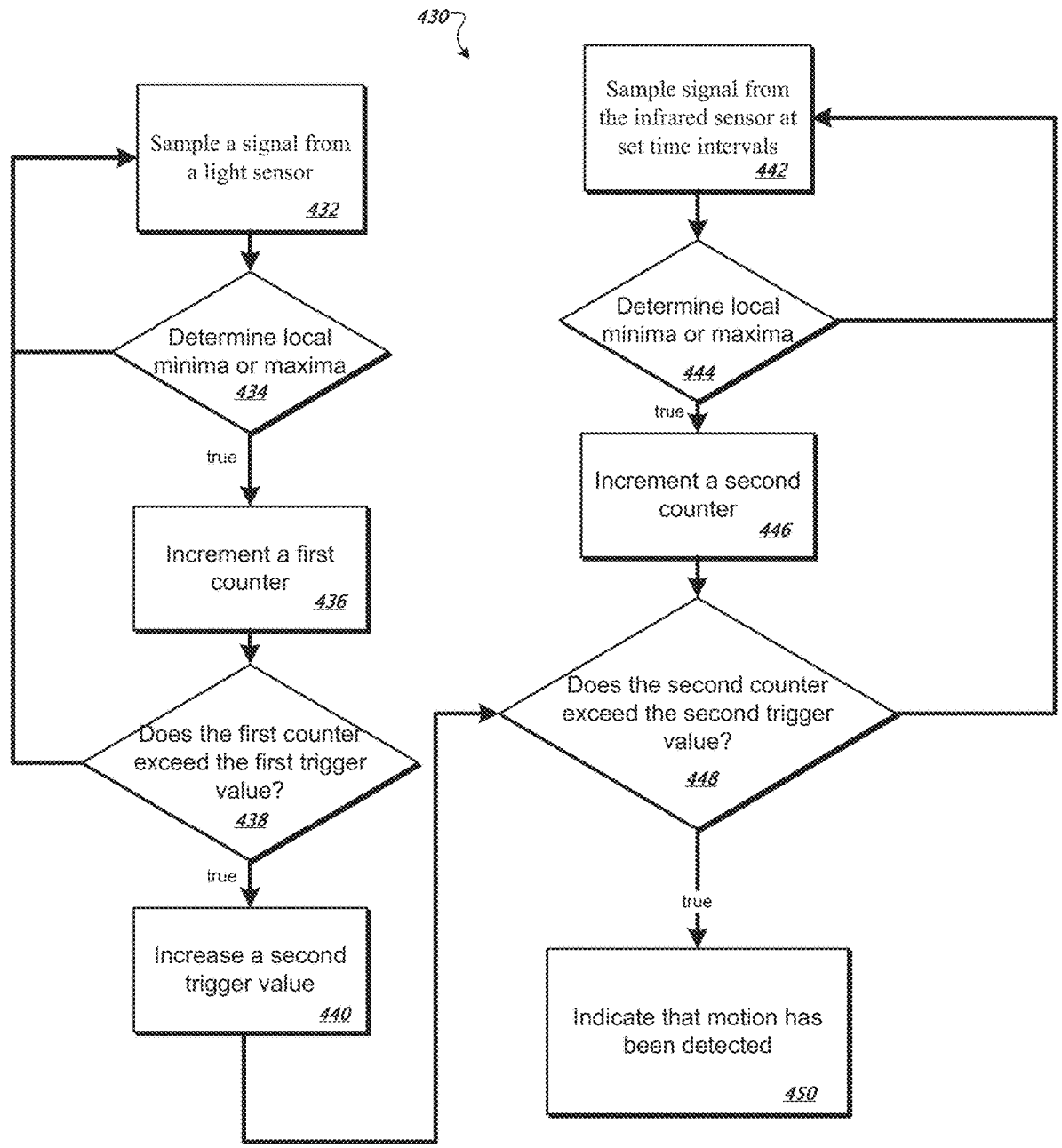
FIG. 3 is a flowchart of a method for accounting for light events when detecting motion.

FIG. 3 illustrates a method 430 of accounting for or otherwise addressing light events when detecting motion. For example, the base station 104 can account for light events when detecting motion. A signal from the light sensor 126 is sampled (432). The signal is processed as described with respect to FIG. 7 to determine local maxima or minima (i.e., peaks) (434). For individual determined local maxima or minima, a first counter is incremented (436). The first counter is compared to a value (438) (e.g., a first trigger value), and if the first counter meets or exceeds the value, a second value (e.g., a second trigger value) for motion detection is incremented (440). The value 438 is an input that sets the level at which visible light variations are likely to trigger false positives.

While the signal from the light sensor 126 is being sampled, a signal from the infrared sensor is also being sampled (442) and processed to determine local maxima or minima (i.e., peaks) (444). This sampling may be done concurrently or in series with one another as the case may be. For individual determined local maxima or minima, a second counter is incremented (446). The second counter is compared to the value (448), and if the second counter meets or exceeds the value (448), the base station 104 indicates that motion has been detected (450).

Figure 4:
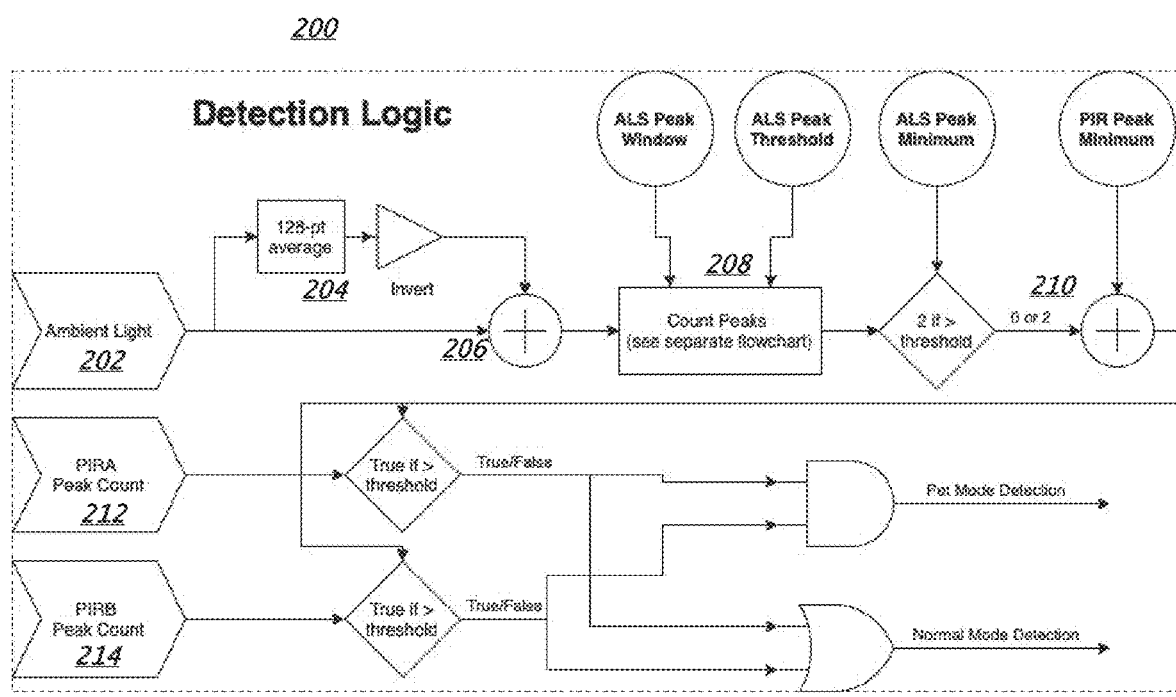
FIG. 4 is a schematic of a logic circuit to account for light events when detecting motion.

FIG. 4 illustrates an example logic 200 that can be used to implement the method 430 of using signals from the light sensor and the infrared receiver to determine whether motion is detected. In this example, a processor in the base station 104 determines whether motion is detected by a motion sensor 102. The processor receives a light signal 202 in the form of an analog wave from the motion detector 102. The light signal 202 is processed to determine an average voltage (204) of the light signal 202. The average voltage is used to center the signal about zero volts (206) which can simplify future calculations (e.g., determining peaks). The centered signal is analyzed to count the number of peaks (208) in the signal. As discussed before, the number of peaks can be indicative of a light event. If the number of peaks in the light signal meets or exceeds a threshold (e.g., three peaks) within a window of time (e.g., 6.5 seconds), then a threshold or trigger value for motion detection is subsequently increased (210). For example, the threshold or trigger value used to detect motion can be increased by two. Using the ambient light sensor to increase the threshold for motion detection accounts for light events which would otherwise trigger a false positive for motion detection.

The processor also receives infrared signals. Individual infrared signals are individually analyzed to count the number of peaks in the signal. For conciseness, the illustrated method shows the processor receiving the peak count 212, 214 of individual infrared signals as inputs. In response to a peak count 212, 214 meets or exceeds a threshold indicative of motion (e.g., the threshold as adjusted in response to processing of the ambient light sensor signal), the processor determines that the respective channel has detected motion. If both peak counts 212, 214 meet or exceed the threshold to determine motion (i.e., trigger value), then the processor determines that both channels have detected motion and alerts the user.

If only one peak count (either 212 or 214) meets or exceeds the threshold indicative of motion, then the detected object was too small or too far away to be detected in both infrared receiver channels. The processor may alert the user depending on the mode of the system. For example, the system has a normal operation mode and a pet mode.

In a normal operation mode, if at least one peak count meets or exceeds the threshold indicative of motion, the processor determines that motion is detected. However, in a pet mode, both peak counts must meet or exceed the threshold indicative of motion for the processor to determine that motion is detected. For example, pets and other small animals are common sources of false positives for motion detection. These small animals are not a threat to home or business security, and should not cause an alarm or alert but yet generate motion that can trigger the alarm or alert of the system. By requiring both channels of the infrared receiver to detect motion for an alert to be triggered in pet mode, the system 100 can reduce false positives caused by pets or other small animals or objects crossing the field of view of the motion detector 102.

Figure 5:
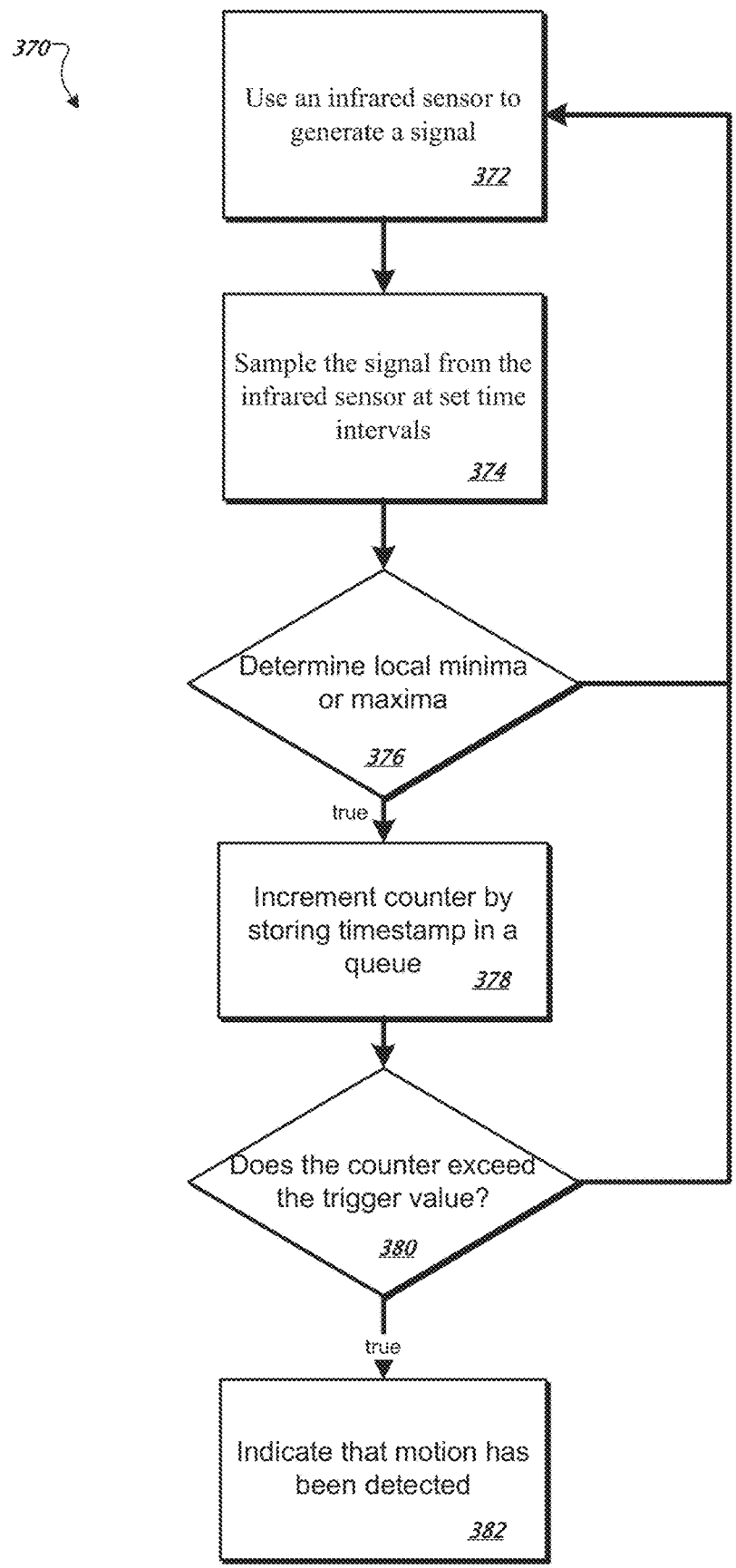
FIG. 5 is a flowchart of a method of detecting motion from an infrared signal.

FIG. 5 illustrates a method 370 of converting infrared signals into a peak count. For example, the base station 104 can use the method 370 to convert infrared signals into a peak count. An infrared sensor is used to generate an infrared signal (372). The base station 104 samples the infrared signal at set time intervals (374). The signal is processed to determine local maxima or minima (i.e., peaks) (376). For individual determined local maxima or minima, a counter is incremented (378). For example, the counter can be incremented by storing the timestamp of the local maxima or minima in a queue. As individual events exceed a specified age, the counter is decremented. The counter is compared to the value (380), and if the counter meets or exceeds the value, the base station 104 indicates that motion has been detected (382).

Figure 6:
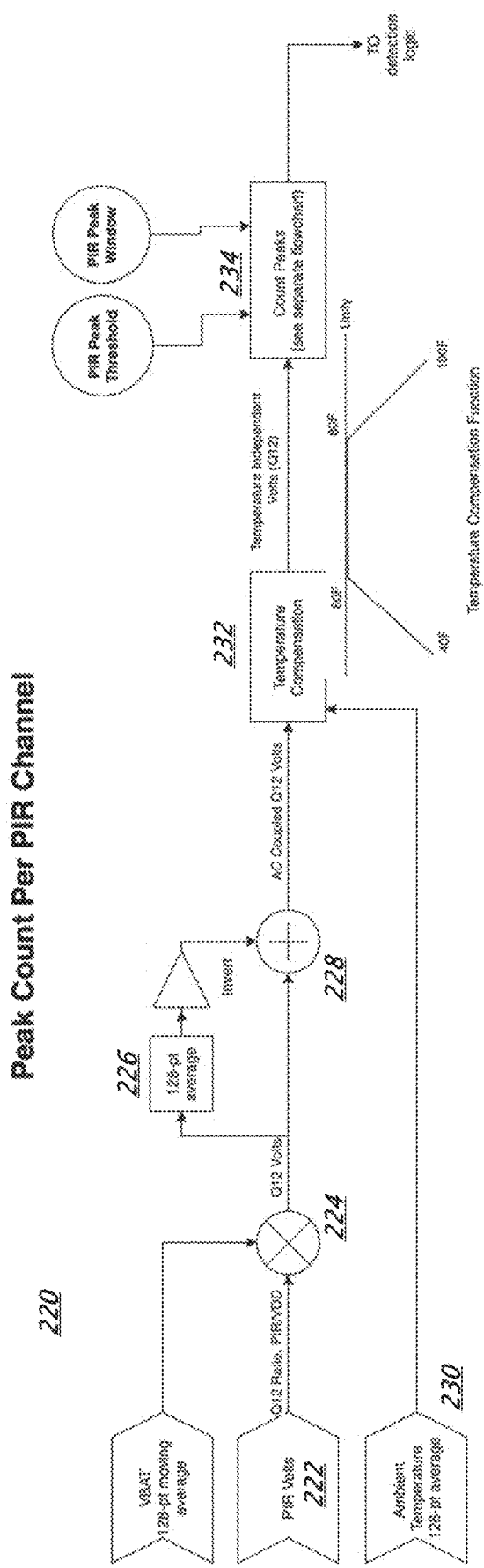
FIG. 6 is schematic of a logic circuit to detect motion from an infrared signal.

FIG. 6 illustrates a logic 220 that can be used to convert infrared signals received from the motion detector 102 into a peak count 212, 214. The method of converting infrared signals in this example is the same for both channels of the infrared receiver but that need not be the case in every instance. The processor receives an infrared signal 222 in volts from the infrared receiver. The infrared signal 222 is processed to determine an average (226) of the infrared signal 222 and use the average to center the signal about zero volts (228). The processor also receives a temperature signal 230 from the motion detector 102. The infrared signal 222 is processed to compensate for the temperature (232) provided by the temperature signal 230. After the infrared signal 222 is processed to compensate for temperature, the infrared signal 222 is analyzed to count the number of peaks (234) in the signal. As discussed previously, the number of peaks in the infrared signal 222 is indicative of motion and can be analyzed to determine whether motion of concern is detected.

The sensitivity of the system can be updated remotely by changing thresholds and parameters. For example, in a situation where false alarms are triggered due to light events, the motion threshold or trigger value for motion detection can be increased by a greater number when the number of peaks in the light signal meets or exceeds a threshold. In a situation where motion is not being properly detected, the motion threshold can be decreased to allow smaller amounts of motion to trigger an alarm. In a situation where the temperature is interfering with the infrared signals, the temperature compensation can be changed remotely in some systems. These remote updates can be input into the system 100 by use of the keypad 106 or the phone 108. In most systems, users choose between preset sensitivity options rather than adjusting parameters directly. For example, an example prototype system has three preset modes (i.e., low (pet), medium, and high sensitivity presets) If the user experiences a false positive alarm event, they might react to this by selecting a lower sensitivity mode on their keypad. The remote updates can also be implemented through a software update to the system 100.

Figure 7:
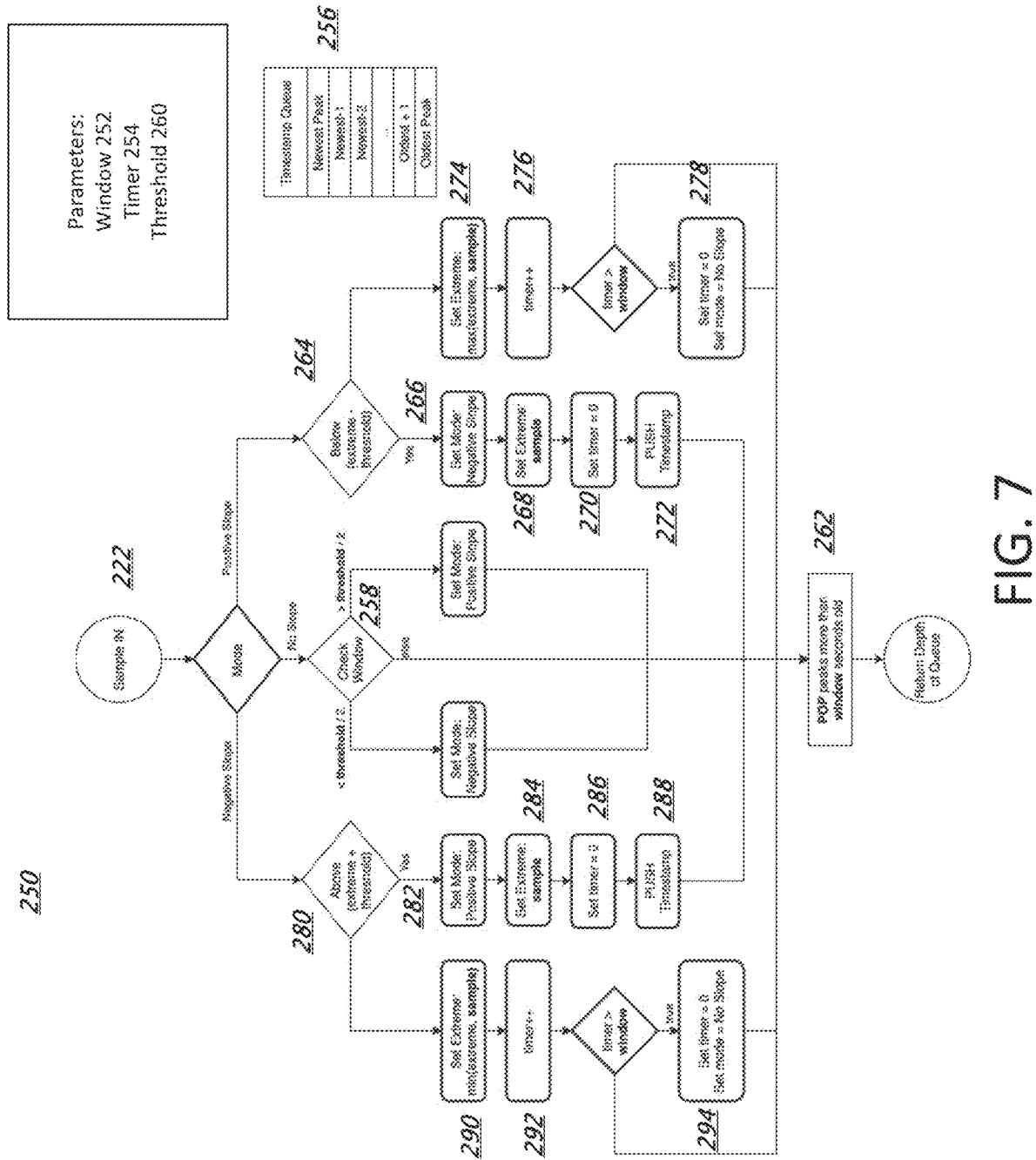
FIG. 7 is a schematic of a logic circuit to detect motion from an infrared signal.

FIG. 7 illustrates a method 250 for counting the number of peaks in a signal (e.g., an infrared signal) 222. The method for counting the number of peaks in a light signal is the same as the method for counting the number of peaks in an infrared signal. The number of peaks is subsequently used to determine whether motion is detected by the motion sensor, as described above. The method can be implemented by a processor in the base station 104 or at a remote server in communication with the base station 104 or in the motion detector 102. The input parameters include a window 252 (e.g., a length of time that peaks are valid for), a timer 254, and queue 256. The timer 254 is the count of how many times the method has been iterated without determining a peak. The window 252 is a limit for how many times the method can be iterated before the timer 254 is reset. For example, if the timer 254 increases to a value greater than the window 252, the timer 254 is reset. The queue 256 stores a timestamp of when individual peaks occur.

The processor samples the infrared signal 222 from the motion detector 102 at set time intervals. The processor analyzes the infrared signal 222 depending on a mode of the detector 102: negative slope, positive slope, or no slope. The slope of the signal determines when a peak occurs. For example, a change in slope from negative to positive (or vice versa) designates a local minima or maxima (i.e., a peak). Both maxima and minima inflection points are considered peaks.

Upon sampling the infrared signal 222, the processor analyzes the sample according to the mode of the detector 102. Initially, the mode is set to no slope. When the mode is set to no slope, the processor checks the sample (258) to see if the sample is greater than or less than an offset 260. The offset 260 determines an amount that a sample can be greater than or less than a previous value (e.g., zero) without changing the mode (i.e., slope). For example, when there is no slope, if the sample is less than 0.2 volts away from zero, then the mode remains set to no slope. If the sample is less than −0.2 volts, the mode is set to negative slope. If the sample is greater than 0.2 volts, then the mode is set to positive slope. The offset 260 filters out noise, small motions (e.g., a curtain waving), and other small changes in infrared energy detection that can be ignored. If there are any timestamps in the queue 256 that are older than a specified window of time, then those peaks are removed (262) from the queue 256. For example, timestamps that are older than 6.5 seconds are removed from the queue 256. The method then outputs the peak count (i.e., the number of timestamps stored in the queue 256). The processor samples the infrared signal 222 again. If there is still no slope, then the processor repeats the same steps.

When the mode is set to positive slope, a peak is designated by a change to negative slope (e.g., a local maxima) in response to a sample being below the extreme (e.g., a previous sample) (264) by an amount greater than the offset 260.

If the sample is below the extreme by an amount greater than the offset 260, then the mode is set to negative slope (266). The new extreme is set to the value of the sample (268) because the sample is below the previous extreme. The timer 254 is set to zero (270), and the timestamp of the peak is stored (272) in the queue 256. If there are any timestamps of peaks that are in the queue 256 and have timestamps that are older than a specified window of time, then those peaks are removed (262) from the queue 256. The method then outputs the peak counter and samples the infrared signal 222 again.

If the sample is not below the extreme by an amount greater than the offset 260, then the extreme is set to the greater sampled value between the previous extreme and the current sample (274). The timer 254 is increased by one (276). If the timer 254 exceeds the window 252, then the timer is reset to zero and the mode is set to no slope (278). If the timer 254 does not exceed the window 252, then the timer does not reset and the mode remains set to positive slope. If there are any timestamps of peaks that are in the queue 256 and have timestamps that are older than a specified window of time, then those peaks are removed (262) from the queue 256. The method then outputs the counter and samples the infrared signal 222 again.

When the mode is set to negative slope, a peak is designated by a change to positive slope (e.g., a local minima) in response to a sample being above the extreme (280) by an amount greater than the offset 260.

If the sample is above the extreme by an amount greater than the offset 260, then the mode is set to positive slope (282). The new extreme is set to the value of the sample (284) because the sample is greater than the previous extreme. The timer 254 is set to zero (286), and the timestamp of the peak is stored (288) in the queue 256. If there are any timestamps in the queue 256 that are older than a specified window of time, those peaks are removed (262) from the queue 256. The method then outputs the peak counter and samples the infrared signal 222 again.

If the sample is not above the extreme by an amount greater than the offset 260, then the extreme is set to the lower sampled value between the previous extreme and the current sample (290). The timer 254 is increased by one (292). If the timer 254 exceeds the window 252, then the timer is reset to zero and the mode is set to no slope (294). If the timer 254 does not exceed the window 252, then the timer does not reset and the mode remains set to negative slope. If there are any timestamps in the queue 256 that are older than a specified time window, those peaks are removed (262) from the queue 256. The method then outputs the counter and samples the infrared signal 222 again.

Figure 8:
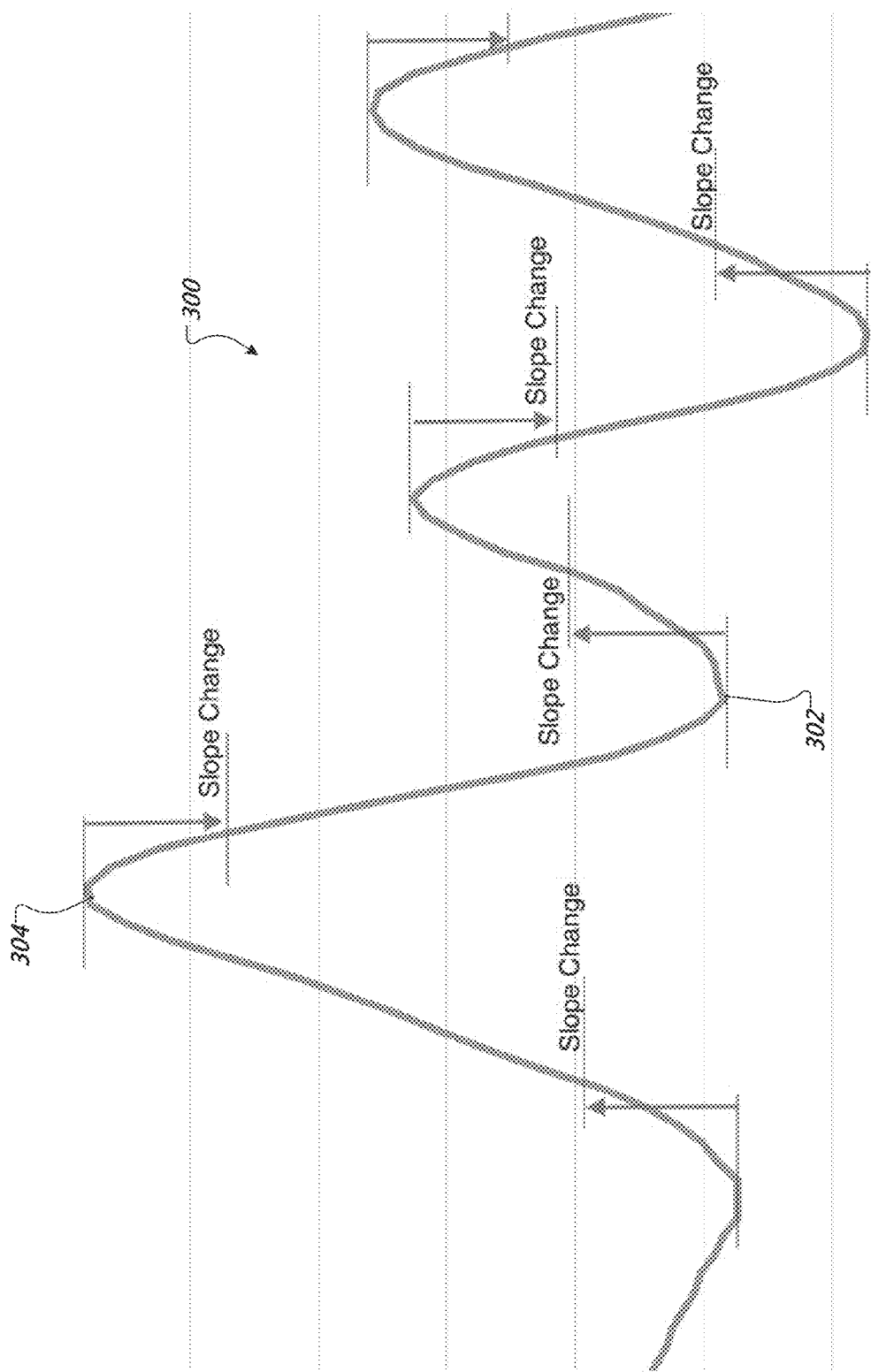
FIG. 8 is an illustration of an analog wave.

FIG. 8 illustrates an exemplary analog sample 300 with local minima 302 and maxima 304 (i.e., peaks). The offset 260 illustrates how much greater a sample must be than a local minima 302 or how much lesser a sample must be than a local maxima 304 to determine a peak. The individual values of the peaks are not essential. Rather, a changing slope of the analog sample is sufficient to determine a local minima 302 or a local maxima 304.

Figure 9A:
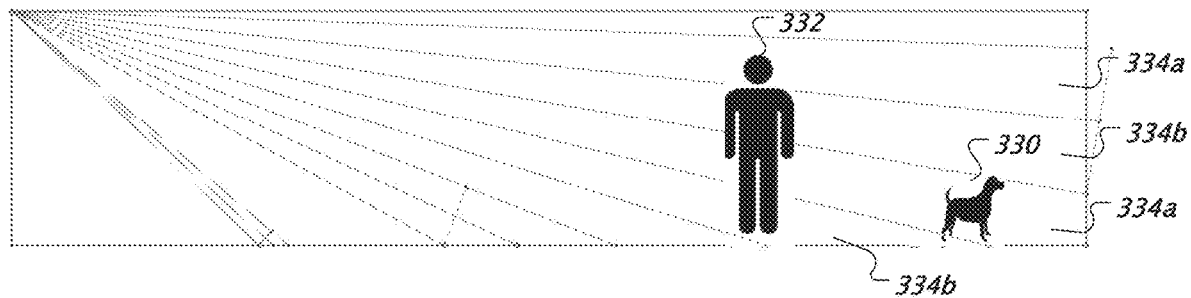
FIG. 9A-9C illustrate the differences in signals generated by small objects and by people.
Figure 9B:
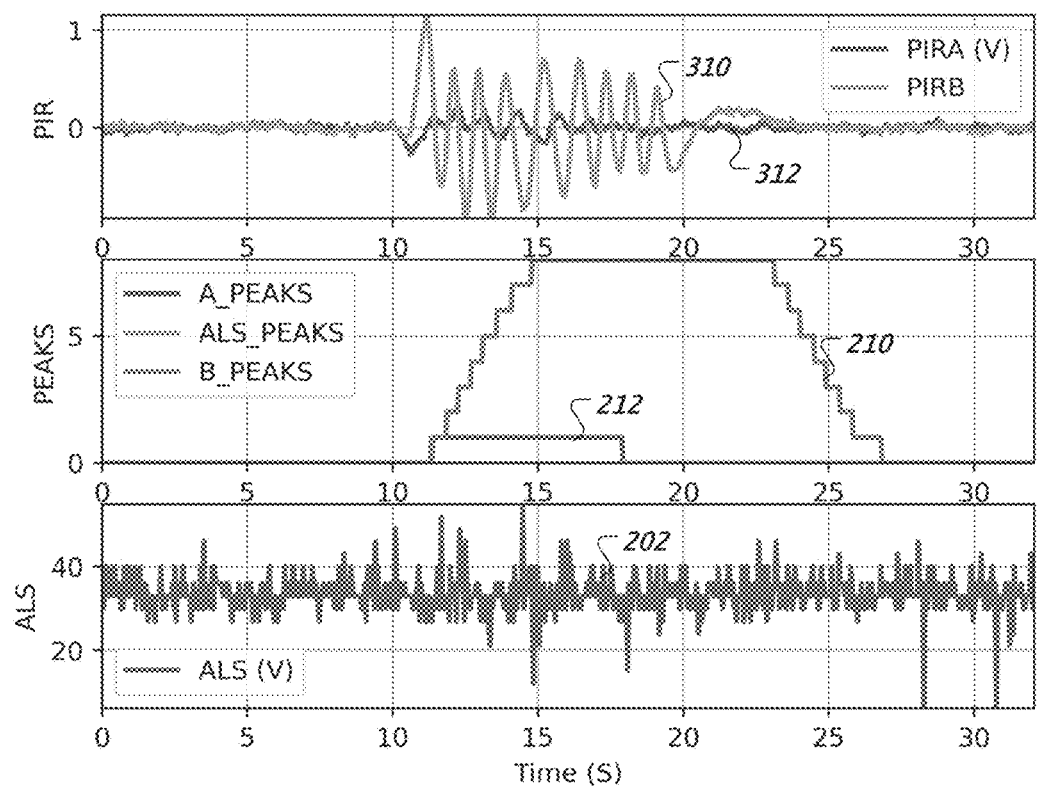
Figure 9C:
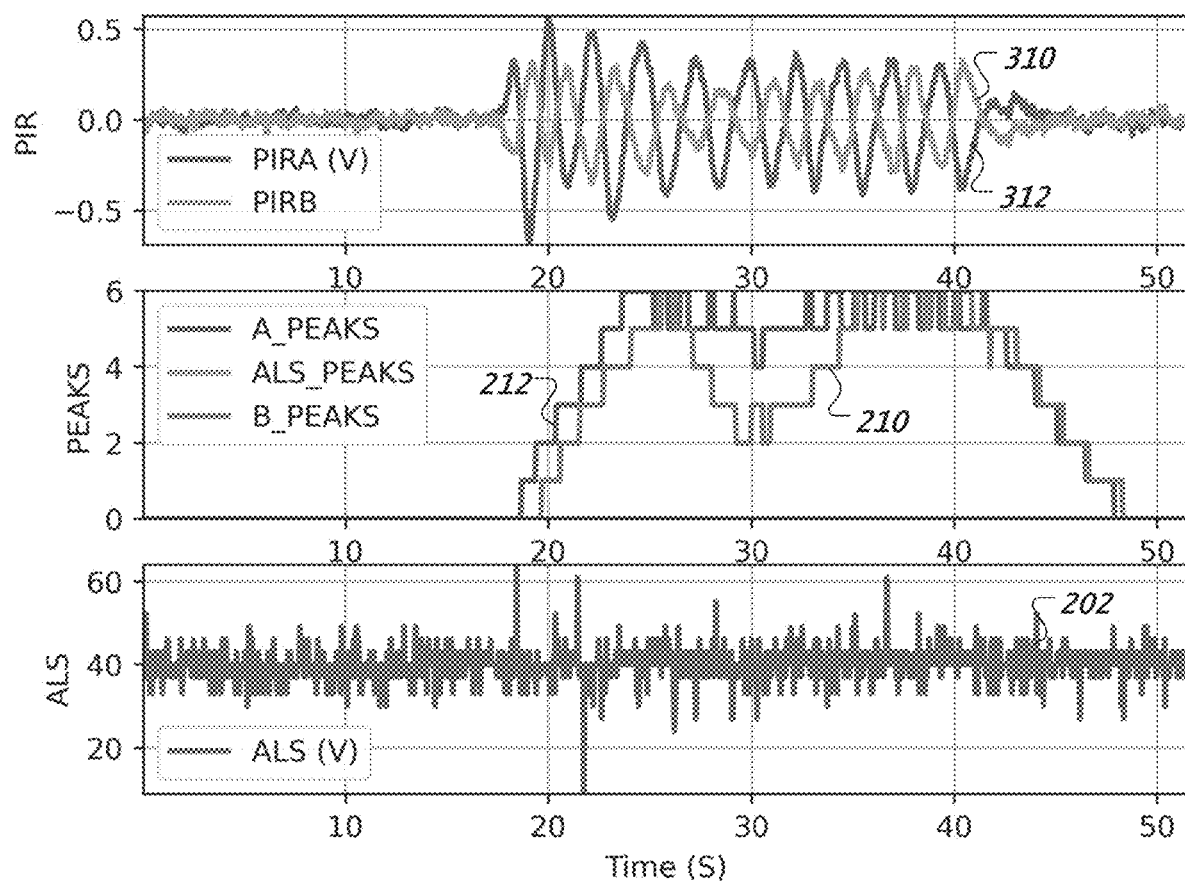

FIGS. 9A-9C illustrate the operation of pet mode. FIG. 9A illustrates a pet 330 and a person 332 in a room with a plurality of zones 334a-b of a motion detector 102. FIG. 9B illustrates exemplary infrared signals generated by a pet or small object (e.g., a robot vacuum cleaner) crossing a room and FIG. 9B illustrates exemplary infrared signals generated by a person crossing the room.

In FIG. 9A, one part 334a of a zone 334 is associated with a first channel of the infrared sensor and the second part 334b of the zone 334 is associated with a second channel of the infrared sensor. The pet 330 is much shorter than the person 332 and does not appear in both channels. In contrast, the person 332 crosses both channels of within different parts 334a and 334b of the zone 334. A pet 330 or other small animal tends to only trigger a single channel of the motion detector 102 and create signals similar to FIG. 8A, which do not cause an alarm. Meanwhile, because the person 332 crosses both parts 334a, 334b of the zone 334, the person 332 is detected by multiple channels of the motion detector 102 and creates signals similar to FIG. 7, which cause an alarm.

FIG. 9B illustrates exemplary infrared signals 310, 312 from two channels of a motion detector 102 generated by robotic toy crossing a room. As illustrated, the infrared signal 310 has multiple peaks, but infrared signal 312 has very few peaks that exceed the offset 260. This reflects the robotic toy being small enough that it tends to be present in one part of a zone rather than both parts of a zone. The peak counter 210 increases along with the number of peaks in the infrared signal 310. The peak counter 212 increases very little, if at all, because the infrared signal 312 has few peaks that would trigger an increase in the counter 212. Because the peak counter 212 increases very little, the peak counter 212 does not meet or exceed the threshold indicative of motion, and the processor does not determine that motion is detected. This example illustrates how these false positives for pets crossing the field of view of the sensor can be effectively reduced or otherwise eliminated. In a medium or high sensitivity mode, this signal would lead the processor to determine motion was detected.

FIG. 9C illustrates exemplary infrared signals 310, 312 from two respective channels of a motion detector 102 generated by a person crossing a room. As illustrated, both signals 310, 312 have multiple peaks. The peak counters 210, 212 both increase as more peak timestamps are stored in the queue. Additionally, the peak counters 210, 212 both decrease as peak timestamps expire from the queue. When the peak counters 210, 212 meet or exceed the motion threshold, the processor or remote server determines that the respective channels have detected motion, as described above. Also illustrated is an exemplary light signal 202 from the light sensor of a motion detector 102. The light signal 202 does not have any peaks, and only indicates noise and the peak counter for the light signal 202 does not increase.

Figure 10:
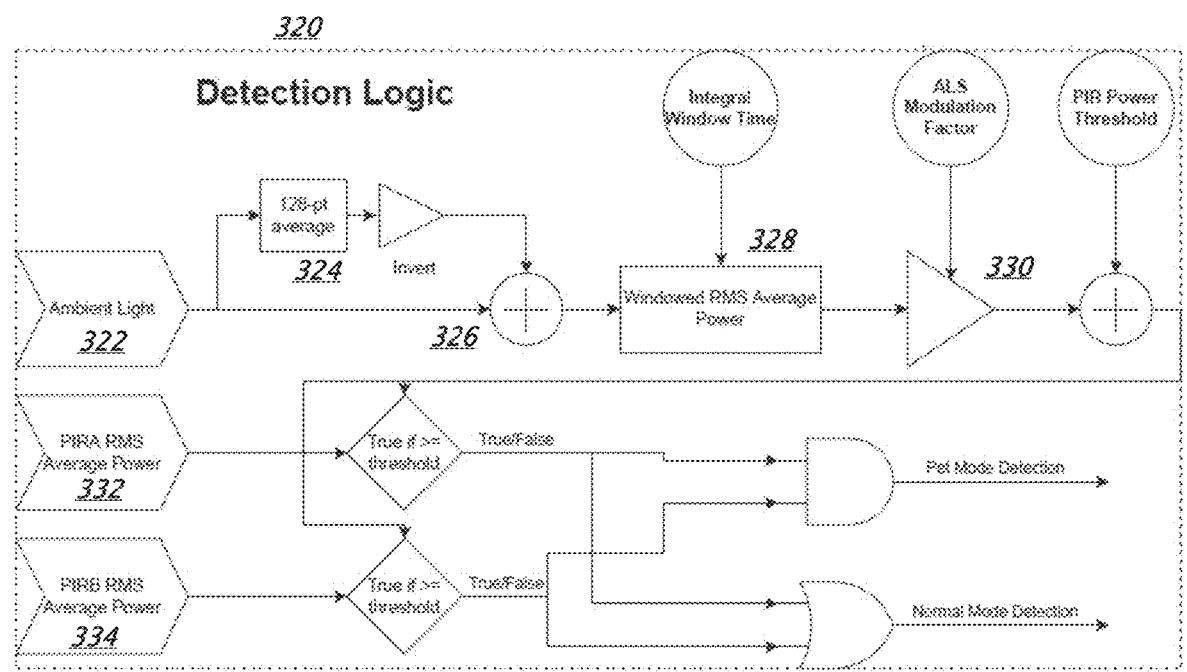
FIG. 10 is a schematic of a logic circuit to account for light events when detecting motion.

FIG. 10 illustrates an example logic 320 that can be used to implement a method of using signals from the light sensor and the infrared receiver to determine whether motion is detected. The method implemented by the example logic 320 is similar to the method 430 described with respect to FIG. 3 but is implemented using average power rather than peak count to determine whether motion is detected. In some implementations, calculating the average power to determine motion is advantageous, e.g., for the reasons discussed below.

In this example, a processor in the base station 104 determines whether motion is detected by a motion sensor 102 by completing the following operations. The processor receives a light signal 322 in the form of an analog wave from the motion detector 102. The light signal 322 is processed to determine an average voltage (324) of the light signal 202. The average voltage is used to center the signal about zero volts (326) which can simplify future calculations (e.g., determining the average power). The centered signal is analyzed to determine the average power (328) in the signal, and the average power is used to generate a value that represents the average power in a received signal over a given window time. The average power over a given window of time can be determined, for example, using a root-mean-square (RMS) calculation. For example, the RMS voltage ($V_{rms}$) can be calculated as $$Vrms = \sqrt{\frac{\sum_{t=0}^{window} v_t^2}{window}}$$

where $v_t$ is each input sample in the window, and the number of samples is equal to the sample rate multiplied by the time of the window.

An increased average power in the signal over a given duration of time can be indicative of a light event. The duration can be adjustable. It is desirable that the duration of time be long enough to capture desired motion events (e.g., an intruder) while excluding events that occur over a long period of time (e.g., a sunrise or operation of an air conditioner). If the average power meets or exceeds a threshold within a duration of time (e.g., 6.5 seconds), then a threshold or trigger value for motion detection is increased (330). For example, the threshold or trigger value used to detect motion can be increased. Using the ambient light sensor to increase the threshold for motion detection accounts for light events which would otherwise trigger a false positive for motion detection.

The processor also receives multiple infrared signals. For example, multiple infrared signals can be used for normal operation mode and a pet mode, as described above. If only one peak count meets or exceeds the threshold indicative of motion, then the detected object was too small or too far away to be detected in both infrared receiver channels. The processor may alert the user depending on the mode of the system. For example, the system has a normal operation mode and a pet mode.

Individual infrared signals are analyzed to calculate the average power in the signal. For example, the average power of the individual infrared signals can be determined using an RMS calculation. For conciseness, the illustrated method shows the average power 332, 334 of individual infrared signals as inputs to the processor. In response to an average power 332, 334 that meets or exceeds a threshold indicative of motion (e.g., the threshold as adjusted in response to processing of the ambient light sensor signal), the processor determines that the respective channel has detected motion. If both the average power 332 and the average power 334 meet or exceed the threshold to determine motion (i.e., trigger value), then the processor determines that both channels have detected motion and alerts the user.

As described above, if only one average power (either 332 or 334) of an individual infrared signal meets or exceeds the threshold indicative of motion, then the detected object is too small or too far away to be detected in both infrared receiver channels. The processor may alert the user depending on the mode of the system. For example, the system has a normal operation mode and a pet mode.

Figure 11:
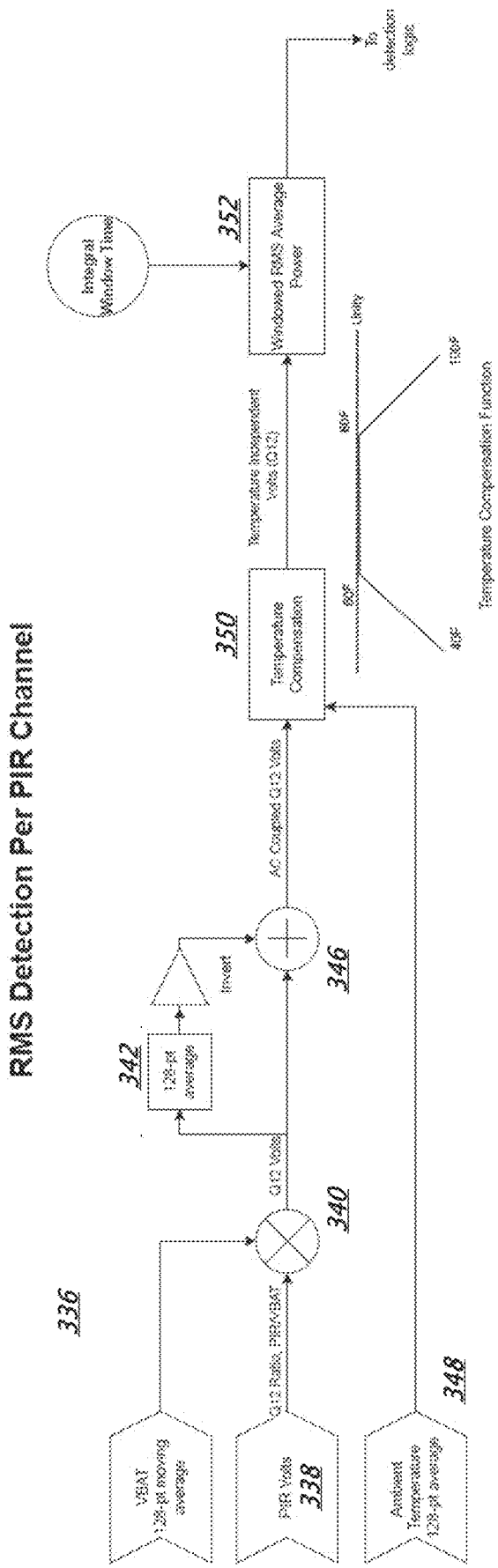
FIG. 11 is a schematic of a logic circuit to detect motion from an infrared signal.

FIG. 11 illustrates a logic 336 that can be used to convert infrared signals received from the motion detector 102 into average power values 332, 334. The method of converting infrared signals in this example is the same for both channels of the infrared receiver but that need not be the case in every instance. The processor receives an infrared signal 338 in volts from the infrared receiver. The infrared signal 338 is processed to determine an average (340) of the infrared signal 338 and use that average to center the signal about zero volts (342). The processor also receives a temperature signal 348 from the motion detector 102. The infrared signal 338 is processed to compensate for the temperature (350) provided by the temperature signal 348 (e.g., using a compensation calculation, a point-slope approximation obtained from a linear fit, etc.). After the infrared signal 338 is processed to compensate for temperature, the infrared signal 338 is analyzed to determine the average power (352) in the signal, e.g., by using the RMS calculation described above. The average power of the infrared signal 338 over a given duration of time is indicative of motion and can be analyzed to determine whether motion of concern is detected. The operations for converting the infrared signals into average power values can be similar to the operations for converting light signals into average power values, as described in regards to FIG. 10.

In some implementations, calculating the average power to determine motion is advantageous. For example, the power thresholds for the average power calculations can be set independently from the duration of time. The sensitivity of the system can be updated remotely by changing thresholds and parameters. These remote updates can be input into the system 100 by use of the keypad 106 or the phone 108. Also, the inputs can be suited to measure the power of sinusoidal signals (e.g., by being sign-independent). Since the incoming signals can be sinusoidal signals, using sign-independent inputs can be more accurate. In some implementations, the root function can be eliminated (e.g., by squaring the function) and the calculation can be achievable simply through addition, multiplication, and division of fixed-point numbers. For example, if the root function is squared, then the RMS voltage ($V_{rms}$) can be calculated as $$Vrms = \frac{\sum_{t=0}^{window} v_t^2}{window}$$

The amount of code and memory can be less than a comparable peak detector, and the system can be tuned by adjusting the window time and power threshold. For example, using addition, multiplication, and division as described above can require less code and memory than the method described in regards to FIG. 7. The system can also be tuned by adjusting the duration of time and power threshold.

The sensitivity of the system can be updated remotely by changing thresholds and parameters. These remote updates can be input into the system 100 by use of the keypad 106 or the phone 108. For example, in a situation where false alarms are triggered due to light events, the motion threshold or trigger value for motion detection can be increased by a greater number when the average power of the light signal meets or exceeds a threshold. In a situation where motion is not being properly detected, the motion threshold can be decreased to allow smaller amounts of motion to trigger an alarm. In a situation where the temperature is interfering with the infrared signals, the temperature compensation can be changed remotely in some systems. For example, the calculation used for temperature compensation can be changed remotely, e.g., by use of the keypad 106 or the phone 108. In most systems, users choose between preset sensitivity options rather than adjusting parameters directly. For example, a prototype system has three preset modes (i.e., low (pet), medium, and high sensitivity presets) If the user experiences a false positive alarm event, they might react to this by selecting a lower sensitivity mode on their keypad. In some systems, users adjust the duration of time and power threshold directly. The remote updates can also be implemented through a software update to the system 100. For example, a manufacturer can update the system 100 remotely by sending a signal to the system 100.

Although the processor has been described as being a part of the motion detector 102, other system components can include processors. For example, the base station 104 can include a processor that executes the described methods.

Figure 12:
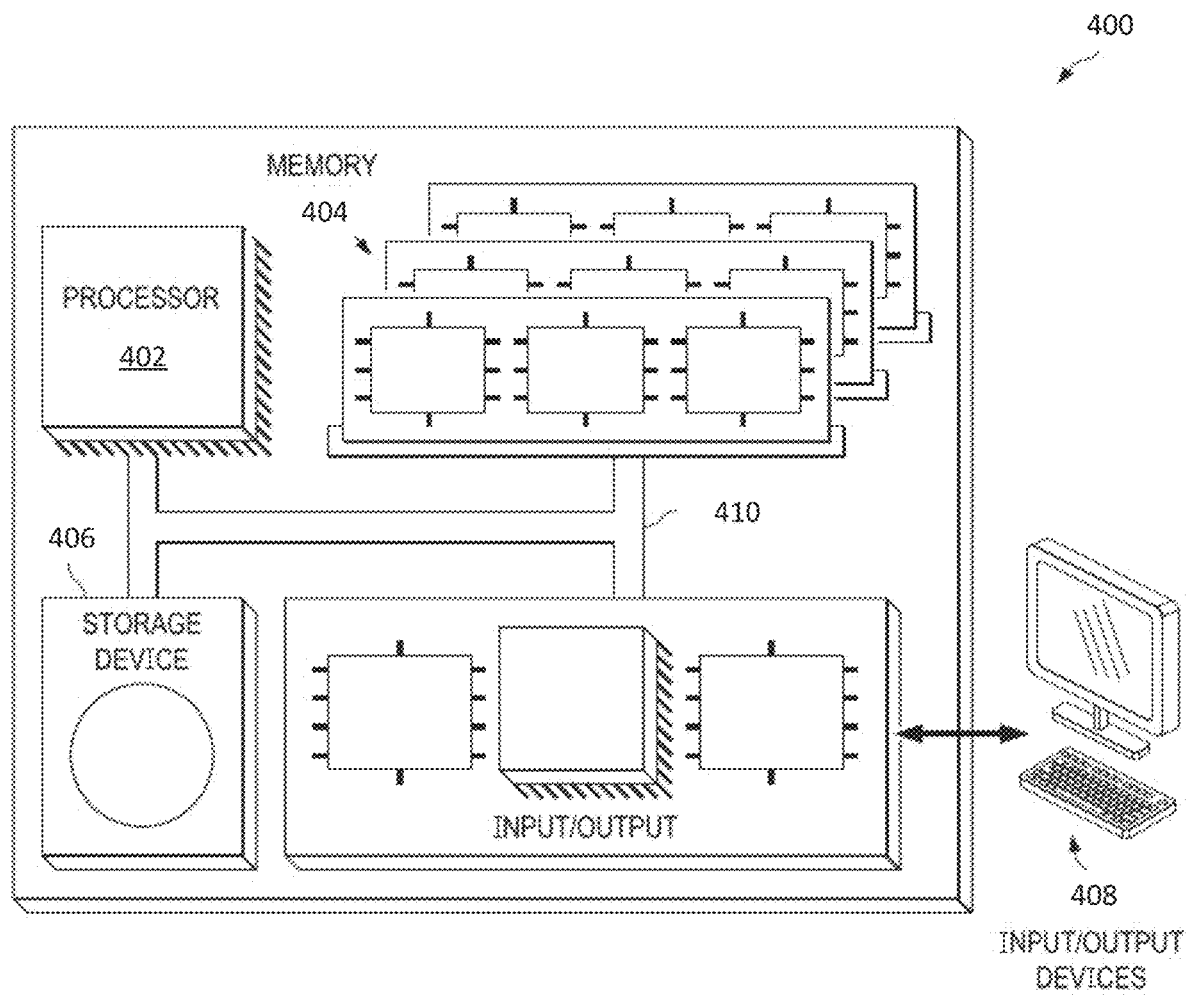
FIG. 12 is a schematic illustration of an example computer of a motion detection system.

FIG. 12 is a schematic illustration of an example computer 400 of the system. For example, the computer 400 includes the processor and/or base station 104 for controlling the system 100.

The computer 400 is intended to include various forms of digital computers, such as printed circuit boards (PCB), processors, digital circuitry, or otherwise parts of a system for determining a subterranean formation breakdown pressure. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The computer 400 includes a processor 402, a memory 404, a storage device 406, and an input/output device 408 (for displays, input devices, example, sensors, valves, pumps). Each of the components 402, 404, 406, and 408 are interconnected using a system bus 410. The processor 402 is capable of processing instructions for execution within the computer 400. The processor may be designed using any of a number of architectures. For example, the processor 402 may be a CISC (Complex Instruction Set Computers) processor, a RISC (Reduced Instruction Set Computer) processor, or a MISC (Minimal Instruction Set Computer) processor.

In one implementation, the processor 402 is a single-threaded processor. In another implementation, the processor 402 is a multi-threaded processor. The processor 402 is capable of processing instructions stored in the memory 404 or on the storage device 406 to display graphical information for a user interface on the input/output device 408.

The memory 404 stores information within the computer 400. In one implementation, the memory 404 is a computer-readable medium. In one implementation, the memory 404 is a volatile memory unit. In another implementation, the memory 404 is a non-volatile memory unit.

The storage device 406 is capable of providing mass storage for the computer 400. In one implementation, the storage device 406 is a computer-readable medium. In various different implementations, the storage device 406 may be a floppy disk device, a hard disk device, an optical disk device, or a tape device.

The input/output device 408 provides input/output operations for the computer 400. In one implementation, the input/output device 408 includes a keyboard and/or pointing device. In another implementation, the input/output device 408 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

This specification describes devices, methods, and systems for detecting motion. It will be appreciated that various changes may be made by those skilled in the art without departing from the spirit and scope of this disclosure.

What is claimed is:

1. A method, comprising:
   acquiring, by a computing system, a first plurality of samples of a first signal generated by an infrared sensor;
   determining, by the computing system, that a first sample of the first plurality of samples is a first local minima or maxima of the first signal;
   in response to the first sample being the first local minima or maxima, incrementing, by the computing system, a first value of a first counter;
   in response to the first value of the first counter exceeding a first threshold within a first window of time, outputting, by the computing system, an indication of motion;
   determining, by the computing system, that a second signal generated by a light sensor satisfies a criterion; and
   in response to the second signal satisfying the criterion, increasing, by the computing system, the first threshold.

2. The method of claim 1, wherein:
   incrementing the first value of the first counter includes storing a first timestamp for the first sample in a queue; and
   the first value of the first counter is based on a quantity of timestamps within the first window of time that are stored in the queue.

3. The method of claim 2, further comprising:
   determining, by the computing system, that a second sample of the first plurality of samples is a second local minima or maxima of the first signal;
   in response to the second sample being the second local minima or maxima, storing, by the computing system, a second timestamp for the second sample in the queue;
   determining, by the computing system, that the second timestamp is outside the first window of time; and
   removing, by the computing system, the second timestamp from the queue based at least in part on the second timestamp being outside the first window of time.

4. The method of claim 1, further comprising:
   receiving, by the computing system, an input representing a changed sensitivity setting; and
   adjusting, by the computing system, the first threshold based at least in part on the changed sensitivity setting.

5. The method of claim 4, wherein:
   receiving the input comprises receiving, by a radio frequency (RF) receiver, an RF signal encoded to represent the changed sensitivity setting; and
   the method further comprises decoding, by the computing system, the RF signal to determine a modified value of the first threshold.

6. The method of claim 1, further comprising:
operating the computing system in a first mode in which the computing system determines whether an amplitude of the first signal increases by more than an offset value; and
in response to the computing system determining that the amplitude of the first signal has increased by more than the offset value, operating the computing system in a second mode in which the computing system determines whether the first signal transitions from a positive slope to a negative slope.

7. The method of claim 6, wherein:
determining that the amplitude of the first signal has increased by more than the offset value includes determining that a second sample of the first plurality of samples is more than the offset value greater than a preceding sample of the first plurality of samples; and
operating the computing system in the second mode includes setting the second sample as a positive extreme.

8. The method of claim 7, further comprising:
determining that a third sample of the first plurality of samples is more than a threshold value below a first one of the first plurality of samples that is currently designated as the positive extreme; and
in response to the third sample being more than the threshold value below the first one of the first plurality of samples that is currently designated as the positive extreme:
incrementing the first value of the first counter, and
operating the computing system in a third mode in which the computing system determines whether the first signal transitions from the negative slope to the positive slope.

9. The method of claim 8, wherein operating the computing system in the third mode comprises setting the third sample as a negative extreme, and the method further comprises:
determining that a fourth sample of the first plurality of samples is more than the threshold value above a second one of the first plurality of samples that is currently designated as the negative extreme; and
in response to the fourth sample being more than the threshold value above the second one of the first plurality of samples that is currently designated as the negative extreme:
incrementing the first value of the first counter, and
operating the computing system in the second mode.

10. The method of claim 8, wherein the offset value is a percentage of the threshold value.

11. The method of claim 1, wherein determining that the second signal satisfies the criterion includes:
acquiring, by the computing system, a second plurality of samples of the second signal;
determining, by the computing system, that a second sample of the second plurality of samples corresponds to a second local minima or maxima of the second signal;
in response to the second sample corresponding to the second local minima or maxima, incrementing, by the computing system, a second value of a second counter; and
determining that the second signal satisfies the criterion based at least in part on the second value of the second counter exceeding a second threshold within a second window of time.

12. The method of claim 11, further comprising:
generating, by the infrared sensor, the first signal; and
generating, by the light sensor, the second signal.

13. The method of claim 1, further comprising:
generating, by the infrared sensor, the first signal; and
generating, by the light sensor, the second signal.

14. The method of claim 1, wherein outputting the indication of motion comprises:
using a radio frequency (RF) transmitter to send, to a base station, an RF signal including a flag indicative of the motion.

15. A system, comprising:
an infrared sensor configured to generate a first signal;
a light sensor configured to generate a second signal;
at least one processor; and
at least one non-transitory computer-readable medium encoded with instructions which, when executed by the at least one processor, cause the system to:
acquire a first plurality of samples of the first signal;
determine that a first sample of the first plurality of samples is a first local minima or maxima of the first signal;
in response to the first sample being the first local minima or maxima, increment a first value of a first counter;
in response to the first value of the first counter exceeding a first threshold within a first window of time, output an indication of motion;
determine that the second signal satisfies a criterion; and
in response to the second signal satisfying the criterion, increase the first threshold.

16. The system of claim 15, wherein the at least one non-transitory computer-readable medium is further encoded with additional instructions which, when executed by the at least one processor, further cause the system to:
increment the first value of the first counter at least in part by storing a first timestamp for the first sample in a queue;
wherein the first value of the first counter is based on a quantity of timestamps within the first window of time that are stored in the queue.

17. The system of claim 16, wherein the at least one non-transitory computer-readable medium is further encoded with additional instructions which, when executed by the at least one processor, further cause the system to:
determine that a second sample of the first plurality of samples is a second local minima or maxima of the first signal;
in response to the second sample being the second local minima or maxima, store a second timestamp for the second sample in the queue;
determine that the second timestamp is outside the first window of time; and
remove the second timestamp from the queue based at least in part on the second timestamp being outside the first window of time.

18. The system of claim 15, wherein the at least one non-transitory computer-readable medium is further encoded with additional instructions which, when executed by the at least one processor, further cause the system to:
receive an input representing a changed sensitivity setting; and
adjust the first threshold based at least in part on the changed sensitivity setting.

19. The system of claim 18, wherein the at least one non-transitory computer-readable medium is further encoded with additional instructions which, when executed by the at least one processor, further cause the system to:
  receive the input at least in part by using a radio frequency (RF) receiver to receive an RF signal encoded to represent the changed sensitivity setting; and
  decode the RF signal to determine a modified value of the first threshold.

20. The system of claim 15, wherein the at least one non-transitory computer-readable medium is further encoded with additional instructions which, when executed by the at least one processor, further cause the system to:
  operate a first mode in which the system determines whether an amplitude of the first signal increases by more than an offset value; and
  in response to determining that the amplitude of the first signal has increased by more than the offset value, operate in a second mode in which the system determines whether the first signal transitions from a positive slope to a negative slope.

21. The system of claim 20, wherein the at least one non-transitory computer-readable medium is further encoded with additional instructions which, when executed by the at least one processor, further cause the system to:
  determine that the amplitude of the first signal has increased by more than the offset value at least in part by determining that a second sample of the first plurality of samples is more than the offset value greater than a preceding sample of the first plurality of samples; and
  operate in the second mode at least in part by setting the second sample as a positive extreme.

22. The system of claim 21, wherein the at least one non-transitory computer-readable medium is further encoded with additional instructions which, when executed by the at least one processor, further cause the system to:
  determine that a third sample of the first plurality of samples is more than a threshold value below a first one of the first plurality of samples that is currently designated as the positive extreme; and
  in response to the third sample being more than the threshold value below the first one of the first plurality of samples that is currently designated as the positive extreme:
    incrementing the first value of the first counter, and
    operate in a third mode in which the system determines whether the first signal transitions from the negative slope to the positive slope.

23. The system of claim 22, wherein the at least one non-transitory computer-readable medium is further encoded with additional instructions which, when executed by the at least one processor, further cause the system to:
  operate the system in the third mode at least in part by setting the third sample as a negative extreme;
  determine that a fourth sample of the first plurality of samples is more than the threshold value above a second one of the first plurality of samples that is currently designated as the negative extreme; and
  in response to the fourth sample being more than the threshold value above the second one of the first plurality of samples that is currently designated as the negative extreme:
    incrementing the first value of the first counter, and
    operate the system in the second mode.

24. The system of claim 22, wherein the offset value is a percentage of the threshold value.

25. The system of claim 15, wherein the at least one non-transitory computer-readable medium is further encoded with additional instructions which, when executed by the at least one processor, further cause the system to determine that the second signal satisfies the criterion at least in part by:
  acquiring a second plurality of samples of the second signal;
  determining that a second sample of the second plurality of samples corresponds to a second local minima or maxima of the second signal;
  in response to the second sample corresponding to the second local minima or maxima, incrementing a second value of a second counter; and
  determining that the second signal satisfies the criterion based at least in part on the second value of the second counter exceeding a second threshold within a second window of time.

26. The system of claim 15, wherein the at least one non-transitory computer-readable medium is further encoded with additional instructions which, when executed by the at least one processor, further cause the system to:
  output the indication of motion at least in part by using a radio frequency (RF) transmitter to send, to a base station, an RF signal including a flag indicative of the motion.

27. A system, comprising:
  a first infrared sensor configured to generate a first signal;
  a second infrared sensor configured to generate a second signal;
  at least one processor; and
  at least one non-transitory computer-readable medium encoded with instructions which, when executed by the at least one processor, cause the system to:
    acquire a first plurality of samples of the first signal;
    determine that a first sample of the first plurality of samples is a first local minima or maxima of the first signal;
    in response to the first sample being the first local minima or maxima, increment a first value of a first counter;
    acquire a second plurality of samples of the second signal;
    determine that a second sample of the second plurality of samples is a second local minima or maxima of the second signal;
    in response to the second sample being the second local minima or maxima, increment a second value of a second counter; and
    in response to the first value of the first counter exceeding a first threshold within a first window of time and the second value of the second counter exceeding a second threshold within a second window of time, outputting an indication of motion.

28. The system of claim 27, wherein the first threshold and the second threshold are a same value.

29. The system of claim 27, wherein the first infrared sensor is configured and arranged to receive infrared radiation from a first portion of individual zones and the second infrared sensor is configured and arranged to receive infrared radiation from a second portion of the individual zones, the second portion being different than the first portion.

30. A method, comprising:
  acquiring, by a computing system, a first plurality of samples of a first signal generated by a first infrared sensor;
  determining, by the computing system, that a first sample of the first plurality of samples is a first local minima or maxima of the first signal;

in response to the first sample being the first local minima or maxima, incrementing, by the computing system, a first value of a first counter;

acquiring, by the computing system, a second plurality of samples of a second signal generated by a second infrared sensor;

determining, by the computing system, that a second sample of the second plurality of samples is a second local minima or maxima of the second signal;

in response to the second sample being the second local minima or maxima, incrementing, by the computing system, a second value of a second counter; and in response to the first value of the first counter exceeding a first threshold within a first window of time and the second value of the second counter exceeding a second threshold within a second window of time, outputting, by the computing system, an indication of motion.

31. The method of claim 30, wherein the first threshold and the second threshold are a same value.

32. The method of claim 30, wherein the first infrared sensor receives infrared radiation from a first portion of individual zones and the second infrared sensor receives infrared radiation form a second portion of the individual zones, the second portion being different than the first portion.

\* \* \* \* \*